(12) United States Patent
Boss et al.

(10) Patent No.: US 10,704,876 B2
(45) Date of Patent: *Jul. 7, 2020

(54) ONE PIECE POLYMER AMMUNITION CARTRIDGE HAVING A PRIMER INSERT AND METHODS OF MAKING THE SAME

(71) Applicant: True Velocity IP Holdings, LLC, Dallas, TX (US)

(72) Inventors: Tyler Lee Boss, Rockwall, TX (US); Lonnie Burrow, Carrollton, TX (US); Michael Edward Godart, Rockwall, TX (US); Jimmie Sloan, Porter, TX (US); Andrew Rosek, Rockwall, TX (US)

(73) Assignee: True Velocity IP Holdings, LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,232

(22) Filed: Aug. 23, 2018

(65) Prior Publication Data

US 2019/0011233 A1    Jan. 10, 2019

Related U.S. Application Data

(63) Continuation-in-part of application No. 15/978,616, filed on May 14, 2018, now Pat. No. 10,345,088, (Continued)

(51) Int. Cl.
*F42B 5/02* (2006.01)
*F42B 5/30* (2006.01)
(Continued)

(52) U.S. Cl.
CPC .............. *F42B 33/00* (2013.01); *B22F 3/004* (2013.01); *B22F 5/06* (2013.01); *C04B 35/64* (2013.01);
(Continued)

(58) Field of Classification Search
CPC ...... F42B 5/02; F42B 5/26; F42B 5/30; F42B 5/307; F42B 5/313; F42B 33/00;
(Continued)

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| DE | 16742 C | 1/1882 |

(Continued)

OTHER PUBLICATIONS

AccurateShooter.com Daily Bulletin "New PolyCase Ammunition and Injection-Molded Bullets" Jan. 11, 2015.
(Continued)

*Primary Examiner* — James S Bergin
(74) *Attorney, Agent, or Firm* — Chainey P. Singleton

(57) ABSTRACT

The present invention provides a single piece polymer ammunition cartridge and polymer ammunition and methods of forming a single piece polymer ammunition cartridge and polymer ammunition.

13 Claims, 7 Drawing Sheets

Related U.S. Application Data which is a continuation of application No. 15/911,544, filed on Mar. 5, 2018, now Pat. No. 10,352,664, which is a continuation of application No. 15/406,844, filed on Jan. 16, 2017, now Pat. No. 9,933,241, which is a continuation of application No. 14/011,202, filed on Aug. 27, 2013, now Pat. No. 9,546,849, which is a continuation of application No. 13/292,843, filed on Nov. 9, 2011, now Pat. No. 8,561,543.

(60) Provisional application No. 61/456,664, filed on Nov. 10, 2010.

(51) Int. Cl.

| | | |
|---|---|---|
| F42B 5/307 | (2006.01) | |
| F42B 33/00 | (2006.01) | |
| F42C 19/08 | (2006.01) | |
| F42B 33/02 | (2006.01) | |
| C22C 38/48 | (2006.01) | |
| B22F 3/00 | (2006.01) | |
| B22F 5/06 | (2006.01) | |
| C04B 35/64 | (2006.01) | |
| C22C 14/00 | (2006.01) | |
| C22C 38/02 | (2006.01) | |
| C22C 38/04 | (2006.01) | |
| C22C 38/18 | (2006.01) | |
| C22C 38/42 | (2006.01) | |
| C22C 38/44 | (2006.01) | |
| C22C 38/58 | (2006.01) | |
| B22F 3/10 | (2006.01) | |
| F42B 33/04 | (2006.01) | |
| F42B 5/313 | (2006.01) | |
| B22F 3/22 | (2006.01) | |
| C22C 33/02 | (2006.01) | |
| B22F 1/00 | (2006.01) | |
| B22F 9/04 | (2006.01) | |
| B33Y 80/00 | (2015.01) | |

(52) U.S. Cl.
CPC .............. *C22C 14/00* (2013.01); *C22C 38/02* (2013.01); *C22C 38/04* (2013.01); *C22C 38/18* (2013.01); *C22C 38/42* (2013.01); *C22C 38/44* (2013.01); *C22C 38/48* (2013.01); *C22C 38/58* (2013.01); *F42B 5/02* (2013.01); *F42B 5/025* (2013.01); *F42B 5/30* (2013.01); *F42B 5/307* (2013.01); *F42B 33/001* (2013.01); *F42B 33/02* (2013.01); *F42C 19/083* (2013.01); *F42C 19/0807* (2013.01); *F42C 19/0823* (2013.01); *B22F 1/0077* (2013.01); *B22F 3/1021* (2013.01); *B22F 3/1025* (2013.01); *B22F 3/225* (2013.01); *B22F 9/04* (2013.01); *B22F 2998/10* (2013.01); *B33Y 80/00* (2014.12); *C22C 33/0257* (2013.01); *C22C 33/0285* (2013.01); *F42B 5/313* (2013.01); *F42B 33/04* (2013.01)

(58) Field of Classification Search
CPC .... F42B 33/001; F42C 19/08; F42C 19/0807; F42C 19/083
USPC ..... 102/430, 447, 464–470; 86/10, 18, 19.5, 86/19.8
See application file for complete search history.

(56) References Cited

U.S. PATENT DOCUMENTS

| 130,679 A | 8/1872 | Whitmore |
|---|---|---|
| 159,665 A | 2/1875 | Gauthey |
| 169,807 A | 11/1875 | Hart |
| 462,611 A | 11/1891 | Comte de Sparre |
| 498,856 A | 6/1893 | Overbaugh |
| 640,856 A | 1/1900 | Bailey |
| 662,137 A | 11/1900 | Tellerson |
| 676,000 A | 6/1901 | Henneberg |
| 865,979 A | 9/1907 | Bailey |
| 869,046 A | 10/1907 | Bailey |
| 905,358 A | 12/1908 | Peters |
| 957,171 A | 5/1910 | Loeb |
| 963,911 A | 7/1910 | Loeble |
| 1,060,817 A | 5/1913 | Clyne |
| 1,936,905 A | 11/1933 | Gaidos |
| 1,940,657 A | 12/1933 | Woodford |
| 2,294,822 A | 9/1942 | Norman |
| 2,465,962 A | 3/1949 | Allen et al. |
| 2,654,319 A | 10/1953 | Roske |
| 2,823,611 A | 2/1958 | Thayer |
| 2,862,446 A | 12/1958 | Lars |
| 2,918,868 A | 12/1959 | Lars |
| 2,953,990 A | 9/1960 | Miller |
| 2,972,947 A | 2/1961 | Fitzsimmons et al. |
| 3,099,958 A | 8/1963 | Daubenspeck et al. |
| 3,159,701 A | 12/1964 | Herter |
| 3,170,401 A | 2/1965 | Johnson et al. |
| 3,171,350 A | 3/1965 | Metcalf et al. |
| 3,242,789 A | 3/1966 | Woodring |
| 3,292,538 A | 12/1966 | Hans et al. |
| 3,485,170 A | 12/1969 | Scanlon |
| 3,485,173 A | 12/1969 | Morgan |
| 3,609,904 A | 10/1971 | Scanlon |
| 3,659,528 A | 5/1972 | Santala |
| 3,688,699 A | 9/1972 | Horn et al. |
| 3,690,256 A | 9/1972 | Schnitzer |
| 3,745,924 A | 7/1973 | Scanlon |
| 3,749,021 A | 7/1973 | Burgess |
| 3,756,156 A | 9/1973 | Schuster |
| 3,765,297 A | 10/1973 | Skochko et al. |
| 3,768,413 A | 10/1973 | Ramsay |
| 3,797,396 A | 3/1974 | Reed |
| 3,842,739 A | 10/1974 | Scanlon et al. |
| 3,866,536 A | 2/1975 | Greenberg |
| 3,874,294 A | 4/1975 | Hale |
| 3,955,506 A | 5/1976 | Luther et al. |
| 3,977,326 A | 8/1976 | Anderson et al. |
| 3,990,366 A | 11/1976 | Scanlon |
| 4,020,763 A | 5/1977 | Iruretagoyena |
| 4,147,107 A | 4/1979 | Ringdal |
| 4,157,684 A | 6/1979 | Clausser |
| 4,173,186 A | 11/1979 | Dunham |
| 4,187,271 A | 2/1980 | Rolston et al. |
| 4,228,724 A | 10/1980 | Leich |
| 4,276,830 A | 7/1981 | Alice |
| 4,475,435 A | 10/1984 | Mantel |
| 4,598,445 A | 7/1986 | O'Connor |
| 4,614,157 A | 9/1986 | Grelle et al. |
| 4,679,505 A | 7/1987 | Reed |
| 4,718,348 A | 1/1988 | Ferrigno |
| 4,719,859 A | 1/1988 | Ballreich et al. |
| 4,726,296 A | 2/1988 | Leshner et al. |
| 4,763,576 A | 8/1988 | Kass et al. |
| 4,867,065 A | 9/1989 | Kaltmann et al. |
| 5,033,386 A | 7/1991 | Vatsvog |
| 5,151,555 A | 9/1992 | Vatsvog |
| 5,165,040 A | 11/1992 | Andersson et al. |
| 5,237,930 A | 8/1993 | Belanger et al. |
| 5,259,288 A | 11/1993 | Vatsvog |
| 5,433,148 A | 7/1995 | Barratault et al. |
| 5,798,478 A | 8/1998 | Beal |
| 5,950,063 A | 9/1999 | Hens et al. |
| 5,969,288 A | 10/1999 | Baud |
| 6,004,682 A | 12/1999 | Rackovan et al. |
| 6,048,379 A | 4/2000 | Bray et al. |
| 6,070,532 A | 6/2000 | Halverson |
| 6,272,993 B1 | 8/2001 | Cook et al. |
| 6,357,357 B1 | 3/2002 | Glasser |
| 6,375,971 B1 | 4/2002 | Hansen |
| 6,450,099 B1 | 9/2002 | Desgland |
| 6,460,464 B1 | 10/2002 | Attarwala |

(56) References Cited

U.S. PATENT DOCUMENTS

| | | |
|---|---|---|
| 6,523,476 B1 | 2/2003 | Riess et al. |
| 6,708,621 B1 | 3/2004 | Forichon-Chaumet et al. |
| 6,752,084 B1 | 6/2004 | Husseini et al. |
| 6,840,149 B2 | 1/2005 | Beal |
| 7,032,492 B2 | 4/2006 | Meshirer |
| 7,204,191 B2 | 4/2007 | Wiley et al. |
| 7,213,519 B2 | 5/2007 | Wiley et al. |
| 7,231,519 B2 | 6/2007 | Joseph et al. |
| 7,232,473 B2 | 6/2007 | Elliott |
| 7,299,750 B2 | 11/2007 | Schikora et al. |
| 7,353,756 B2 | 4/2008 | Leasure |
| 7,392,746 B2 | 7/2008 | Hansen |
| 7,461,597 B2 | 12/2008 | Brunn |
| 7,585,166 B2 | 9/2009 | Buja |
| 7,610,858 B2 | 11/2009 | Chung |
| 7,750,091 B2 | 7/2010 | Maljkovic et al. |
| 7,930,977 B2 | 4/2011 | Klein |
| 8,007,370 B2 | 8/2011 | Hirsch et al. |
| 8,056,232 B2 | 11/2011 | Patel et al. |
| 8,156,870 B2 | 4/2012 | South |
| 8,201,867 B2 | 6/2012 | Thomeczek |
| 8,206,522 B2 | 6/2012 | Sandstrom et al. |
| 8,240,252 B2 | 8/2012 | Maljkovic et al. |
| 8,408,137 B2 | 4/2013 | Battaglia |
| 8,443,729 B2 | 5/2013 | Mittelstaedt |
| 8,443,730 B2 | 5/2013 | Padgett |
| 8,511,233 B2 | 8/2013 | Nilsson |
| 8,522,684 B2 | 9/2013 | Davies et al. |
| 8,540,828 B2 | 9/2013 | Busky et al. |
| 8,561,543 B2 * | 10/2013 | Burrow ............... F42B 5/307 102/467 |
| 8,573,126 B2 | 11/2013 | Klein et al. |
| 8,641,842 B2 | 2/2014 | Hafner et al. |
| 8,689,696 B1 | 4/2014 | Seeman et al. |
| 8,763,535 B2 | 7/2014 | Padgett |
| 8,790,455 B2 | 7/2014 | Borissov et al. |
| 8,807,008 B2 | 8/2014 | Padgett et al. |
| 8,813,650 B2 | 8/2014 | Maljkovic et al. |
| D715,888 S | 10/2014 | Padgett |
| 8,850,985 B2 | 10/2014 | Maljkovic et al. |
| 8,857,343 B2 | 10/2014 | Marx |
| 8,869,702 B2 | 10/2014 | Padgett |
| 8,875,633 B2 | 11/2014 | Padgett |
| 8,893,621 B1 | 11/2014 | Escobar |
| 8,978,559 B2 | 3/2015 | Davies et al. |
| 9,003,973 B1 | 4/2015 | Padgett |
| 9,032,855 B1 | 5/2015 | Foren et al. |
| 9,091,516 B2 | 7/2015 | Davies et al. |
| 9,103,641 B2 | 8/2015 | Nielson et al. |
| 9,157,709 B2 | 10/2015 | Nuetzman et al. |
| 9,170,080 B2 | 10/2015 | Poore et al. |
| 9,182,204 B2 | 11/2015 | Maljkovic et al. |
| 9,188,412 B2 | 11/2015 | Maljkovic et al. |
| 9,200,157 B2 | 12/2015 | El-Hibri et al. |
| 9,200,880 B1 | 12/2015 | Foren et al. |
| 9,212,876 B1 | 12/2015 | Kostka et al. |
| 9,212,879 B2 | 12/2015 | Whitworth |
| 9,213,175 B2 | 12/2015 | Arnold |
| 9,254,503 B2 | 2/2016 | Ward |
| 9,255,775 B1 | 2/2016 | Rubin |
| 9,329,004 B2 | 5/2016 | Pace |
| 9,335,137 B2 | 5/2016 | Maljkovic et al. |
| 9,337,278 B1 | 5/2016 | Gu et al. |
| 9,347,457 B2 | 5/2016 | Ahrens et al. |
| 9,366,512 B2 | 6/2016 | Burczynski et al. |
| 9,377,278 B2 | 6/2016 | Rubin |
| 9,389,052 B2 | 7/2016 | Conroy et al. |
| 9,395,165 B2 | 7/2016 | Maljkovic et al. |
| D764,624 S | 8/2016 | Masinelli |
| D765,214 S | 8/2016 | Padgett |
| 9,429,407 B2 | 8/2016 | Burrow |
| 9,441,930 B2 | 9/2016 | Burrow |
| 9,453,714 B2 | 9/2016 | Bosarge et al. |
| 9,500,453 B2 | 11/2016 | Schluckebier et al. |
| 9,506,735 B1 | 11/2016 | Burrow |
| 9,513,096 B2 | 12/2016 | Burrow |
| 9,518,810 B1 | 12/2016 | Burrow |
| 9,523,563 B1 | 12/2016 | Burrow |
| 9,528,799 B2 | 12/2016 | Maljkovic |
| 9,546,849 B2 * | 1/2017 | Burrow ............... F42B 5/307 |
| 9,551,557 B1 | 1/2017 | Burrow |
| D778,391 S | 2/2017 | Burrow |
| D778,393 S | 2/2017 | Burrow |
| D778,394 S | 2/2017 | Burrow |
| D778,395 S | 2/2017 | Burrow |
| D779,021 S | 2/2017 | Burrow |
| D779,024 S | 2/2017 | Burrow |
| 9,587,918 B1 | 3/2017 | Burrow |
| 9,599,443 B2 | 3/2017 | Padgett et al. |
| 9,625,241 B2 | 4/2017 | Neugebauer |
| 9,631,907 B2 * | 4/2017 | Burrow ............... F42B 5/307 |
| 9,644,930 B1 | 5/2017 | Burrow |
| 9,658,042 B2 | 5/2017 | Emary |
| 9,683,818 B2 | 6/2017 | Lemke et al. |
| 9,709,368 B2 | 7/2017 | Mahnke |
| 9,759,554 B2 | 9/2017 | Ng et al. |
| 9,784,667 B2 | 10/2017 | Lukay et al. |
| 9,835,423 B2 * | 12/2017 | Burrow ............... F42B 5/307 |
| 9,835,427 B2 | 12/2017 | Burrow |
| 9,857,151 B2 | 1/2018 | Dionne et al. |
| 9,869,536 B2 | 1/2018 | Burrow |
| 9,879,954 B2 | 1/2018 | Hajjar |
| 9,885,551 B2 * | 2/2018 | Burrow ............... F42B 5/307 |
| 9,921,040 B2 | 3/2018 | Rubin |
| 9,927,219 B2 | 3/2018 | Burrow |
| 9,933,241 B2 * | 4/2018 | Burrow ............... F42B 5/307 |
| 9,939,236 B2 * | 4/2018 | Drobockyi ............ F42B 5/285 |
| 9,964,388 B1 | 5/2018 | Burrow |
| 9,989,339 B2 | 6/2018 | Riess |
| 10,041,770 B2 | 8/2018 | Burrow |
| 10,041,771 B1 | 8/2018 | Burrow |
| 10,041,776 B1 | 8/2018 | Burrow |
| 10,041,777 B1 | 8/2018 | Burrow |
| 10,048,049 B2 | 8/2018 | Burrow |
| 10,048,050 B1 | 8/2018 | Burrow |
| 10,048,052 B2 | 8/2018 | Burrow |
| 10,054,413 B1 | 8/2018 | Burrow |
| D828,483 S | 9/2018 | Burrow |
| 2003/0127011 A1 | 7/2003 | Mackerell et al. |
| 2006/0027125 A1 | 2/2006 | Brunn |
| 2006/0278116 A1 | 12/2006 | Hunt |
| 2007/0056343 A1 | 3/2007 | Cremonesi |
| 2007/0214993 A1 | 9/2007 | Cerovic et al. |
| 2010/0234132 A1 | 9/2010 | Hirsch et al. |
| 2011/0179965 A1 | 7/2011 | Mason |
| 2013/0186294 A1 | 7/2013 | Davies et al. |
| 2013/0291711 A1 | 11/2013 | Mason |
| 2014/0260925 A1 | 9/2014 | Beach et al. |
| 2015/0226220 A1 | 8/2015 | Bevington |
| 2015/0268020 A1 | 9/2015 | Emary |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0102030 A1 | 4/2016 | Coffey et al. |
| 2016/0245626 A1 | 8/2016 | Drieling et al. |
| 2016/0349023 A1 | 12/2016 | Burrow |
| 2016/0349028 A1 | 12/2016 | Burrow |
| 2016/0356588 A1 | 12/2016 | Burrow |
| 2016/0377399 A1 | 12/2016 | Burrow |
| 2017/0080498 A1 | 3/2017 | Burrow |
| 2017/0082409 A1 | 3/2017 | Burrow |
| 2017/0082411 A1 | 3/2017 | Burrow |
| 2017/0089673 A1 | 3/2017 | Burrow |
| 2017/0089675 A1 | 3/2017 | Burrow |
| 2017/0153099 A9 * | 6/2017 | Burrow ............... F42B 5/307 |
| 2017/0205217 A9 * | 7/2017 | Burrow ............... F42B 5/307 |
| 2017/0299352 A9 | 10/2017 | Burrow |
| 2018/0066925 A1 | 3/2018 | Skowron et al. |

(56) References Cited

U.S. PATENT DOCUMENTS

| | | | |
|---|---|---|---|
| 2018/0224253 A1* | 8/2018 | Burrow | F42B 5/307 |
| 2018/0224256 A1 | 8/2018 | Burrow | |
| 2018/0259310 A1* | 9/2018 | Burrow | F42B 5/307 |
| 2018/0306558 A1 | 10/2018 | Padgett et al. | |
| 2019/0011232 A1* | 1/2019 | Boss | F42B 33/00 |
| 2019/0011233 A1* | 1/2019 | Boss | F42B 33/00 |
| 2019/0011234 A1* | 1/2019 | Boss | F42B 33/00 |
| 2019/0011235 A1* | 1/2019 | Boss | F42B 33/00 |
| 2019/0011236 A1 | 1/2019 | Burrow | |
| 2019/0011237 A1 | 1/2019 | Burrow | |
| 2019/0011238 A1 | 1/2019 | Burrow | |
| 2019/0011239 A1 | 1/2019 | Burrow | |
| 2019/0011240 A1 | 1/2019 | Burrow | |
| 2019/0011241 A1 | 1/2019 | Burrow | |
| 2019/0025019 A1 | 1/2019 | Burrow | |
| 2019/0025020 A1 | 1/2019 | Burrow | |
| 2019/0025021 A1 | 1/2019 | Burrow | |
| 2019/0025022 A1 | 1/2019 | Burrow | |
| 2019/0025023 A1 | 1/2019 | Burrow | |
| 2019/0025024 A1 | 1/2019 | Burrow | |
| 2019/0025025 A1 | 1/2019 | Burrow | |
| 2019/0025026 A1 | 1/2019 | Burrow | |
| 2019/0025035 A1 | 1/2019 | Burrow | |
| 2019/0025036 A1 | 1/2019 | Burrow | |

FOREIGN PATENT DOCUMENTS

| | | |
|---|---|---|
| EP | 2625486 A4 | 8/2017 |
| FR | 1412414 A | 10/1965 |
| GB | 783023 A | 9/1957 |
| WO | 0034732 | 6/2000 |
| WO | 2007014024 A2 | 2/2007 |
| WO | 2012047615 A1 | 4/2012 |
| WO | 2012097320 A1 | 7/2012 |
| WO | 2012097317 A3 | 11/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |

OTHER PUBLICATIONS

Korean Intellectual Property Office (ISA), International Search Report and Written Opinion for PCT/US2011/062781 dated Nov. 30, 2012, 16 pp.

Korean Intellectual Property Office (ISA), International Search Report and Written Opinion for PCT/US2015/038061 dated Sep. 21, 2015, 28 pages.

* cited by examiner

ONE PIECE POLYMER AMMUNITION
CARTRIDGE HAVING A PRIMER INSERT
AND METHODS OF MAKING THE SAME

CROSS-REFERENCE TO RELATED
APPLICATIONS

This application is a Continuation-in-part application of co-pending U.S. patent application Ser. No. 15/978,616 filed May 14, 2018, which is a continuation of U.S. patent application Ser. No. 14/011,202 filed on Aug. 27, 2013 now U.S. Pat. No. 9,546,849 issued Jan. 17, 2017, which is a division of U.S. patent application Ser. No. 13/292,843 filed on Nov. 9, 2011 now U.S. Pat. No. 8,561,543 issued Oct. 13, 2013, which claims the benefit of U.S. Provisional Patent Application Ser. No. 61/456,664, filed Nov. 10, 2010, the contents of each are hereby incorporated by reference in their entirety.

TECHNICAL FIELD OF THE INVENTION

The present invention relates in general to the field of ammunition, specifically to compositions of matter and methods of making polymeric ammunition cartridges and polymeric ammunition made as a single piece.

STATEMENT OF FEDERALLY FUNDED
RESEARCH

None.

INCORPORATION-BY-REFERENCE OF
MATERIALS FILED ON COMPACT DISC

None.

BACKGROUND OF THE INVENTION

Without limiting the scope of the invention, its background is described in connection with lightweight polymer cartridge and ammunition. Conventional ammunition cartridges for small caliber, as well as larger caliber weapons, are made from brass, which is heavy, expensive, and potentially hazardous. There exists a need for an affordable lighter weight replacement for brass ammunition that can increase mission performance and operational capabilities. Lightweight polymer ammunition must meet the reliability and performance standards of existing fielded ammunition and be interchangeable with existing weaponry. Reliable cartridge casings manufacture requires uniformity (e.g., bullet seating, bullet-to-casing fit, casing strength, case dimensions, etc.) from one cartridge to the next in order to obtain consistent pressures within the casing during firing prior to bullet and casing separation to create uniformed ballistic performance. Plastic cartridge casings have been known for many years but have failed to provide satisfactory ammunition that could be produced in commercial quantities with sufficient safety, ballistic, handling characteristics, and survive physical and natural conditions to which it will be exposed during the ammunition's intended life cycle; however, these characteristics have not been achieved.

Shortcomings of the known methods of producing plastic or substantially plastic ammunition include the possibility of the projectile being pushed into the cartridge casing, the bullet being held too light such that the bullet can fall out, the bullet being held insufficient to create sufficient chamber pressure, the bullet pull not being uniform from round to round, and the cartridge not being able to maintain the necessary pressure, portions of the cartridge casing breaking off upon firing causing the weapon to jam or damage or danger when subsequent rounds are fired or when the casing portions themselves become projectiles. To overcome the above shortcomings, improvements in cartridge case design and performance polymer materials are needed.

BRIEF SUMMARY OF THE INVENTION

The present invention provided polymer ammunition cases (cartridges) injection molded over a primer insert and methods of making thereof. The present invention provided polymer ammunition noses that mate to the polymer ammunition cases to be loaded to make polymer ammunition and methods of making thereof.

The present invention provides a polymeric ammunition cartridge made by the process of: providing a polymer ammunition cartridge blank comprising an unformed top end connected to a cartridge bottom by a polymer middle body to form a propellant chamber, wherein the unformed top end comprises a nose end aperture, wherein the cartridge bottom comprises a primer insert comprising a top surface opposite a bottom surface and a coupling element that extends from the bottom surface, a primer recess in the top surface that extends toward the bottom surface, a primer flash hole aperture positioned in the primer recess to extend through the bottom surface and a groove in the primer recess positioned around the flash hole aperture, wherein the middle body is overmolded through the primer flash hole aperture into the groove; providing a thermal form comprising a body segment extending to a shoulder segment that transitions to a neck segment that terminates at a tip segment end and a mandrel extendable into the neck segment at the tip segment end; heating the thermal form; inserting the unformed top end into the thermal form; extending the mandrel into the nose end aperture; contacting the unformed top end with the tip segment end to form a polymer ammunition cartridge having a shoulder connected to a neck, wherein the nose end aperture forms a projectile aperture; and removing the polymer ammunition cartridge from the thermal form. The polymer ammunition cartridge is formed from a ductile polymer. The polymeric ammunition cartridge further comprising the steps of forming a texturing at the nose end aperture. The texturing includes one or more selected from etching, grooves, hatching, knurling, a texture, rings, and free formed textures. The texturing is on an internal neck region. The mandrel comprises a texturing that textures the nose end aperture. The texturing includes one or more selected from etching, grooves, hatching, knurling, a texture, rings, and free formed textures. The polymer ammunition cartridge blank comprise a nylon polymer. The polymer ammunition cartridge blank is formed from a fiber-reinforced polymeric material. The fiber-reinforced polymeric composite contains between about 10 and about 70 wt % glass fiber fillers, mineral fillers, or mixtures thereof. The polymer ammunition cartridge blank comprise a polymers selected from the group consisting of polyurethane prepolymer, cellulose, fluoro-polymer, ethylene interpolymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyarylsulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers. The polymer ammunition cartridge blank comprises one or more polymers selected from the group consisting of polybutylene, polybutylene terephthalates, polyphenyl sulfones, polyether sulfones, and polycarbonates. The polymer ammunition cartridge blank is a .17 HMR, .17 Hornet, .17 Ackley Hornet, .17 Winchester Super Magnum, .17-32 Magnum, .17 VHA, .17 Remington, .17/222, .17 Mach .17 Ackley Improved Bee, .17-357 RG, .17 Remington Fireball, .17 Incinerator, 4.39×39 Rmm SPS, .204 Ruger, 5 mm Remington Rimfire Magnum, 5.45×39 mm Russian family, .22 Short, .22 Long, .22 Long Rifle, .22 Stinger, 22 Extra Long, .297/230 Morris Extra Long, .22 Hornet, .22 Rem Automatic, 5.66×39 MPS, .22 Rem Jet, .218 Bee, .219 Zipper, .22 Hornet-K, .220 Swift, .222 Remington, .222 Remington Magnum, .223 Remington, 5.56×45 mm NATO, 5.7×28 mm, .22 TCM, 5.8×42 Chinese, .224 Weatherby Magnum, .225 Winchester, .223 Winchester Super Short Magnum (Obsolete) .223 Ackley Improved, .219 Donaldson Wasp, .221 Remington Fireball, .22-250 Remington and many more, .243 Winchester, .244 Remington, 6 mm Remington, 6 mm plastic airsoft BBs, 6 mm Whisper, 6 mm PPC, 6 mm Bench Rest Remington, 6×45 mm, 6×47 mm, 6 mm Cheetah, .240 Weatherby, 6×62 Freres, 6 mm Norma BR, 6XC Tubb, 6 mm JDJ, 6 mm SAW, 6-250 Walker, 6.17 Spitfire, 6.17 Flash, 6 mm Lee Navy, and more, .25 ACP (.251"), 250/3000 Savage, 257 Roberts, 25-06 (.257"), .277, 6.5×55 mm, .260 Remington, 26 Nosler, 6.5 Creedmoor, 6.5×47 Lapua, .270 Winchester, 6.8, 6.8 SPC, .280 Remington, 7 mm-08 Remington, 7 mm Remington Magnum, 7×57 mm Mauser, 7×64 mm, .30 Luger (7.65×21 mm Luger), .30-30 Win, 30 Herrett, .300 Whisper, .30-378 Weatherby, 7.63 Mannlicher-Schoenauer, 7.63 Mauser, .30 USA Rimless, .308 Corbon, .3-9 Savage, .30 Kurz, 300 AAC Blackout (7.62×35 mm), 7.5 mm Schmidt-Rubin, .300 Winchester Magnum, .30 Carbine, 309 JDJ, .30-03, 0.30-06 Springfield, .30-06 JDJ, .307 GNR, .308 Winchester (7.62× 51 mm NATO), .300 Weatherby Magnum, .30 Army (.30-40 Krag), 7.82 mm Lazzeroni, and dozens more, .303 British, 7.62×39 mm Soviet, 7.62×54 mmR, 7.62×25 mm, 7.7×58 mm, .32 ACP, 8×57 mm IS, .325 WSM, 8 mm Remington Magnum, 8 mm plastic (airsoft) BBs, .338 Lapua, .338 Norma Magnum, .338 Winchester Magnum, .338-378 Weatherby Magnum, 9 mm Luger, 9 mm Ultra, 9 mm Bayard Long, 9 mm Browning Long, 9 mm Mauser, 9 mm Winchester Magnum, 9 mm Glisenti, 9×21 mm, 9×23 mm Winchester, 9 mm Mi-Bullet, 9 mm Steyr, .356 Team Smith & Wesson, 9 mm Federal, 9 mm×25 mm Dillon, 9 mm Action Express, .380 ACP (9 mm Short), 9×56 mm Mannlicher-Schoenauer, 9 mm×57 mm Mauser, .38 Super, .38 Special, .357 Magnum, .357 SIG, .35 Remington, 9×18 mm Makarov, 9.3×62 mm, 9.3×64 mm Brenneke, 9.3×72 mmR, 9.3×74 mm, .375 H&H Magnum, 9.5×57 mm Mannlicher-Schönauer (.375 Rimless Nitro Express (RNE)×2¼), .40 S&W, 10 mm Auto, .444 Marlin, .44 S&W Russian, .44 S&W Special, .44 Remington Magnum, .44 Auto Mag, .440 Cor-Bon, 44/454 JDJ Woodswalker, .45 ACP, .45 GAP, .454 Casull, .45 Long Colt, .455 Webley, .50 BMG, .50 Action Express, 12.7×108 mm polymer ammunition cartridge blank.

The present invention provides a method of making a polymeric ammunition cartridge by providing a polymer ammunition cartridge blank comprising an unformed top end connected to a cartridge bottom by a polymer middle body to form a propellant chamber, wherein the unformed top end comprises a nose end aperture, wherein the cartridge bottom comprises a primer insert comprising a top surface opposite a bottom surface and a coupling element that extends from the bottom surface, a primer recess in the top surface that extends toward the bottom surface, a primer flash hole aperture positioned in the primer recess to extend through the bottom surface and a groove in the primer recess positioned around the flash hole aperture, wherein the middle body is overmolded through the primer flash hole aperture into the groove; providing a thermal form comprising a body segment extending to a shoulder segment that transitions to a neck segment that terminates at a tip segment end and a mandrel extendable into the neck segment at the tip segment end; heating the thermal form; inserting the unformed top end into the thermal form; extending the mandrel into the nose end aperture; contacting the unformed top end with the tip segment end to form a polymer ammunition cartridge having a shoulder connected to a neck, wherein the nose end aperture forms a projectile aperture; and removing the polymer ammunition cartridge from the thermal form.

The present invention provides a polymeric ammunition cartridge made by the steps of providing a polymer ammunition cartridge blank comprising an unformed top end connected to a cartridge bottom by a polymer middle body to form a propellant chamber, wherein the unformed top end comprises a nose end aperture, wherein the cartridge bottom comprises a primer insert comprising a top surface opposite a bottom surface and a coupling element that extends from the bottom surface, a primer recess in the top surface that extends toward the bottom surface, a primer flash hole aperture positioned in the primer recess to extend through the bottom surface and a groove in the primer recess positioned around the flash hole aperture, wherein the middle body is overmolded through the primer flash hole aperture into the groove; providing a thermal form comprising a body segment extending to a shoulder segment that transitions to a neck segment that terminates at a tip segment end and a mandrel extendable into the neck segment at the tip segment end; heating the thermal form; inserting the unformed top end into the thermal form; extending the mandrel into the nose end aperture; contacting the unformed top end with the tip segment end to form a polymer ammunition cartridge having a shoulder connected to a neck, wherein the nose end aperture forms a projectile aperture; removing the polymer ammunition cartridge from the thermal form.

The present invention provides a single piece polymeric ammunition cartridge comprising: a primer insert comprising a top surface opposite a bottom surface, a coupling element extending away from the bottom surface and a primer recess in the top surface that extends toward the bottom surface, a primer flash aperture positioned in the primer recess to extend through the bottom surface, and a groove that extends circumferentially about the primer flash aperture in the primer recess, wherein the groove is adapted to receive a polymer overmolding; and a polymeric single piece body extending from a projectile aperture to a neck region that transitions to a shoulder region that extends to overmold the primer insert, wherein the polymeric single piece body extends over the coupling element into the primer flash aperture and into the groove to form a flash hole.

The present invention provides a single piece polymeric ammunition comprising: a primer insert comprising a top surface opposite a bottom surface, a coupling element extending away from the bottom surface and a primer recess in the top surface that extends toward the bottom surface, a primer flash aperture positioned in the primer recess to extend through the bottom surface, and a groove that extends circumferentially about the primer flash aperture in the primer recess, wherein the groove is adapted to receive a polymer overmolding; a polymeric single piece body extending from a projectile aperture to a neck region that transitions to a shoulder region that extends to overmold the primer insert, wherein the polymeric single piece body extends over the coupling element into the primer flash aperture and into the groove to form a flash hole; a propellant chamber defined between the primer flash aperture and the projectile aperture; a diffuser inserted into the primer recess; a primer inserted into the primer recess in contact with the diffuser; a propellant at least partially filling the propellant chamber; and a projectile frictionally fitted in the bullet-end aperture.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
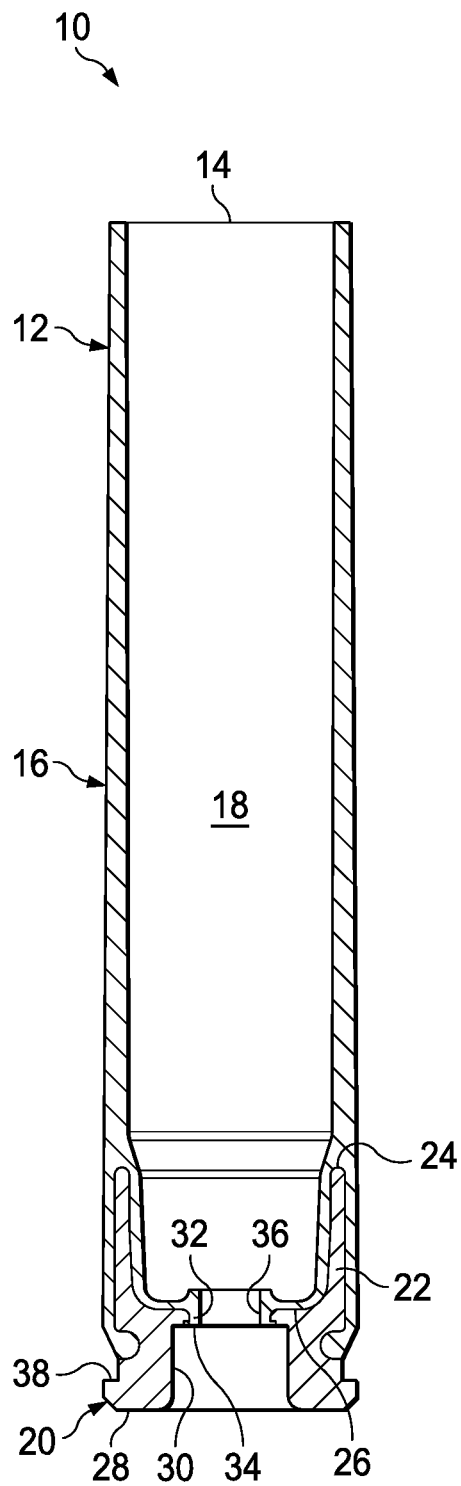
FIG. 1 depicts a side, cross-sectional view of a single piece polymeric cartridge blank prior to forming the neck and shoulder.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Reliable cartridge manufacture requires uniformity from one cartridge to the next in order to obtain consistent ballistic performance. Among other considerations, proper bullet seating and bullet-to-casing fit is required. In this manner, a desired pressure develops within the casing during firing prior to bullet and casing separation. Historically, bullets employ a cannelure, which is a slight annular depression formed in a surface of the bullet at a location determined to be the optimal seating depth for the bullet. In this manner, a visual inspection of a cartridge could determine whether or not the bullet is seated at the proper depth. Once the bullet is inserted into the casing to the proper depth, one of two standard procedures are incorporated to lock the bullet in its proper location. One method is the crimping of the entire end of the casing into the cannelure. A second method does not crimp the casing end; rather the bullet is pressure fitted into the casing and optionally contacted with adhesive.

As used herein, the term "ammunition", "ammunition article", "munition", and "munition article" as used herein may be used interchangeably to refer to a complete, assembled round or cartridge that is ready to be loaded into a firearm and fired, including cap, casing, propellant, projectile, etc. Ammunition may be a live round fitted with a projectile, or a blank round with no projectile and may also be other types such as non-lethal rounds, rounds containing rubber bullets, rounds containing multiple projectiles (shot), and rounds containing projectiles other than bullets such as fluid-filled canisters, tracers, armor piercing, incendiary or capsules. Ammunition may be any caliber of pistol or rifle ammunition. The projectile may have any profile but generally has an aerodynamic streamlined shape at the head and at the tail, e.g., sabot, spritzer, flat base spritzer, boat tail spritzer, tapered-heel spritzer, rounded nose, rounded nose flat base, rounded nose boat tail, rounded nose tapered-heel, flat nose, flat nose flat base, flat nose boat tail, flat nose tapered-heel, hollow point, hollow point boat tail, hollow point flat base, hollow point tapered-heel and so on. Although any head shape can be used, more common shapes include spritzer shape, round, conical, frustoconical, blunted, wadcutter, or hollow point, and the more common tail shape includes flat base, boat tail, tapered-heel expanded bases or banded bases. The bullets of the present invention may have any profile and weight dictated by the particular application. For example, the method and bullets of the present invention may be used in full metal jacket metal cased and full metal jacket both refer to bullets with a metal coating that covers all of, or all but the base of a bullet; metal cased (e.g., as used by REMINGTON® to refer to their full metal jacketed bullets); hollow point bullets have a concave shaped tip that facilitates rapid expansion of the round upon impact; boat tail bullets have a streamlined base to facilitate better aerodynamics; boat tail hollow point; full metal jacketed boat tail; point jacketed hollow point bullets are similar in design to regular hollow point bullets, but have a copper jacket that normally covers everything but the hollowed portion of the round; jacketed flat point rounds have a flat area of exposed lead at the tip; jacketed soft point bullets usually have a spire pointed tip of exposed lead. Jacketed spitzer point can refer to a jacketed spitzer point; spitzer meaning a sharply pointed bullet; jacketed round nose jacketed round nose bullets split the difference between jacketed flat point and jacketed spitzer point bullets and have a rounded tip of exposed lead boat tail soft point sometimes the letters in the acronyms are switched, so boat tail soft point may also be abbreviated as soft point boat tail. Expanding full metal jacketed rounds appear as and feed like a regular full metal jacket bullet, but have a construction that allows the case to collapse and the bullet to flatten upon impact. Wad cutter designs often appear to be nothing more than a cylinder, usually with a hollow base which is used in target practice to punch neat holes in the paper, rather than the ragged holes produced by more rounded designs. Semi wad cutter bullets have a rounded nose that comes down to a cylinder that is slightly larger than the rounded section, giving the bullet a more aerodynamic shape while allowing it to punch clean holes in paper targets. Rounded flat point bullets have a flat tip that is smaller than the bullet diameter and rounded shoulders. Armor piercing ammunition can have bullets with a variety of shapes, though in general they are spire pointed and full metal jacketed rounds that have a strong core designed to penetrate armor. Armor piercing incendiary ammunition has the same penetrating abilities of armor piercing bullets, but with the added function of bursting into an intense flame upon impact. Frangible ammunition are characterized by a design that facilitates the rapid breakup of the bullet upon impact, thus, reducing the chances of over-penetration or a ricochet. Exploding ammunition includes delayed and aerial/above ground exploding ammunition plus ammunition that can penetrate an objective and have a delay before exploding after penetrating. Also included are jacketed designs where the core material is a very hard, high-density metal such as tungsten, tungsten carbide, depleted uranium, or steel.

As used herein, the terms "ammunition cartridge," "cartridge," "casing" and "case" and "body" are used interchangeably (e.g., "cartridge casing", "cartridge case" and "casing body") to refer to the portion of the ammunition that remains intact after firing and includes the propellant chamber. A cartridge may be one-piece, two-piece, three piece or multi-piece design that includes a mouth at one end and a primer insert at the other separated by a propellant chamber. The cartridges, therefore, are of a caliber between about .05 and about 8 inches. Thus, the present invention is also applicable to the sporting goods industry for use by hunters and target shooters. The present invention includes but is not limited to the following caliber families: .172 or 4 mm includes but is not limited to .17 HMR, .17 Hornet, .17 Ackley Hornet, .17 Winchester Super Magnum, .17-32 Magnum, .17 VHA, .17 Remington, .17/222, 0.17 Mach .17 Ackley Improved Bee, .17-357 RG, .17 Remington Fireball, .17 Incinerator, 4.39×39 Rmm SPS; the caliber family .20, .204 or 5 mm; the caliber family .204 Ruger, 5 mm Remington Rimfire Magnum; The caliber family .221 or 5.45 mm includes but is not limited to 5.45×39 mm Russian family; The caliber family .22 or 5.6 mm includes but is not limited to .22 Short, .22 Long, .22 Long Rifle, .22 Stinger, 22 Extra Long, .297/230 Morris Extra Long, .22 Hornet, .22 Rem Automatic, 5.66×39 MPS, .22 Rem Jet; The caliber family .224 or 5.7 mm includes but is not limited to .218 Bee, .219 Zipper, .22 Hornet-K, .220 Swift, .222 Remington, .222 Remington Magnum, .223 Remington, 5.56×45 mm NATO, 5.7×28 mm, .22 TCM, 5.8×42 Chinese, .224 Weatherby Magnum, .225 Winchester, .223 Winchester Super Short Magnum (Obsolete) .223 Ackley Improved, .219 Donaldson Wasp, .221 Remington Fireball, .22-250 Remington and many more; The caliber family .243 or 6 mm; The caliber family .243 Winchester, .244 Remington, 6 mm Remington, 6 mm plastic airsoft BBs, 6 mm Whisper, 6 mm PPC, 6 mm Bench Rest Remington, 6×45 mm, 6×47 mm, 6 mm Cheetah, .240 Weatherby, 6×62 Freres, 6 mm Norma BR, 6XC Tubb, 6 mm JDJ, 6 mm SAW, 6-250 Walker, 6.17 Spitfire, 6.17 Flash, 6 mm Lee Navy, and more, The caliber family .25 or 6.35 mm includes but is not limited to .25 ACP (.251"), 250/3000 Savage, 257 Roberts, 25-06 (.257"), The caliber family .26 or 6.5 mm includes but is not limited to 6.5×55 mm, .260 Remington, 26 Nosler, 6.5 Creedmoor, 6.5×47 Lapua; The caliber family .27 or 6.8 mm includes but is not limited to .270 Winchester, 6.8 SPC; The caliber family .284 or 7 mm; The caliber family .280 Remington, 7 mm-08 Remington, 7 mm Remington Magnum, 7×57 mm Mauser, 7×64 mm; The caliber family .308 or 7.62 mm includes but is not limited to .30 Luger (7.65×21 mm Luger), .30-30 Win, 30 Herrett, .300 Whisper, .30-378 Weatherby, 7.63 Mannlicher-Schoenauer, 7.63 Mauser, .30 USA Rimless, .308 Corbon, .3-9 Savage, .30 Kurz, 300 AAC Blackout (7.62×35 mm), 7.5 mm Schmidt-Rubin, .300 Winchester Magnum, .30 Carbine, 309 JDJ, .30-03, 0.30-06 Springfield, .30-06 JDJ, .307 GNR, .308 Winchester (7.62×51 mm NATO), .300 Weatherby Magnum, .30 Army (.30-40 Krag), 7.82 mm Lazzeroni, and dozens more; The caliber family .311 or 7.9 mm includes but is not limited to .303 British, 7.62×39 mm Soviet, 7.62×54 mmR, 7.62×25 mm, 7.7×58 mm; The caliber family .312 or 7.94 mm includes but is not limited to .32 ACP; The caliber family .323 or 8 mm; 8×57 mm IS, .325 WSM, 8 mm Remington Magnum, 8 mm plastic (airsoft) BBs; The caliber family .338 or 8.6 mm includes but is not limited to .338 Lapua, .338 Norma Magnum, .338 Winchester Magnum, .338-378 Weatherby Magnum; The caliber family .355 or 9 mm includes but is not limited to 9 mm Luger, 9 mm Ultra, 9 mm Bayard Long, 9 mm Browning Long, 9 mm Mauser, 9 mm Winchester Magnum, 9 mm Glisenti, 9×21 mm, 9×23 mm Winchester, 9 mm Mi-Bullet, 9 mm Steyr, .356 Team Smith & Wesson, 9 mm Federal, 9 mm×25 mm Dillon, 9 mm Action Express; The caliber family .356 or 9 mm includes but is not limited to .380 ACP (9 mm Short), 9×56 mm Mannlicher-Schoenauer, 9 mm×57 mm Mauser; The caliber family .357 or 9 mm; The caliber family .38 Super, .38 Special, .357 Magnum, .357 SIG, .35 Remington; The caliber family .363 or 9 mm includes but is not limited to 9×18 mm Makarov; The caliber family .365 or 9.3 mm includes but is not limited to 9.3×62 mm, 9.3×64 mm Brenneke, 9.3×72 mmR, 9.3×74 mmR; The caliber family .375 or 9.5 mm includes but is not limited to .375 H&H Magnum, 9.5×57 mm Mannlicher-Schönauer (.375 Rimless Nitro Express (RNE)×2¼); The caliber family .40 or 10 mm; The caliber family .40 S&W, 10 mm Auto, The caliber family .44 or 10.9 mm includes but is not limited to .444 Marlin, .44 S&W Russian, .44 S&W Special, .44 Remington Magnum, .44 Auto Mag, .440 Corbon, .44/454 JDJ Woodswalker; The caliber family .45 or 11.43 mm includes but is not limited to .45 ACP, .45 GAP, 454 Casull, .45 Long Colt, .455 Webley; The caliber family .50 or 12.7 mm includes but is not limited to .50 BMG, .50 Action Express, 12.7×108 mm FIG. 1 depicts a side, cross-sectional view of a polymeric cartridge blank 10 prior to being formed into a polymeric ammunition cartridge. A cartridge blank 10 is formed by overmolding a polymer over the primer insert and into a case having a case length that is longer then the case length of a finished ammunition cartridge to allow for forming the shoulder (not shown) and neck (not shown). After the neck and shoulder are formed the cartridge blank 10 will have the same case length as a brass case or a two piece polymer case. The polymeric cartridge blank 10 includes an unformed top region 12 having a nose end aperture 14 that extends to a middle body component 16 that houses a propellant chamber 18 to an overmolded primer insert 20. The unformed top end 12 will be formed into the neck (not shown) and shoulder (not shown) and extends to a middle body component 16. The middle body component 16 typically has a wall thickness between about .003 and about .200 inches and more preferably between about .005 and more preferably between about .150 inches about .010 and about .050 inches. The middle body component 16 is molded over the primer insert 20. The primer insert 20 includes an insert coupling element 22 extending from a coupling tip 24 to a bottom surface 26 which is opposite a top surface 28. Located in the top surface 28 is a primer recess 30 that extends toward the bottom surface 26. Upon overmolding, the polymer material of the middle body component 16 is molded over the coupling element 22 and the coupling tip 24 to engage the insert coupling element 22 on both the inside and outside. A primer flash hole aperture 32 is located in the primer recess 30 and extends through the bottom surface 26 into the propellant chamber 18. A flash hole groove 34 is positioned around the primer flash hole aperture 32 in the primer recess 30. When overmolded the middle body component 16 extends over the coupling tip 24 into the primer flash hole aperture 32 and into the flash hole groove 34 to form a flash hole 36. The flash hole 36 is a polymer coating over the primer flash hole aperture 32 that allows passage from the primer recess 30 to the propellant chamber 18. The primer insert 20 includes an extraction flange 38 to allow the extraction of the cartridge from the chamber (not shown). The insert coupling element 22, as shown may be configured as a male element; however, all combinations of male and female configurations are acceptable and the insert coupling element 22 may be if any length. The flash hole groove 34 may extend partially or entirely along the bottom of the primer recess 30. In other embodiments, the flash hole groove 34 may extend partially or entirely along the side wall of the primer recess 30 to allow the overmolded polymer to extend into the flash hole groove 34 that extend partially or entirely along the side wall of the primer recess 30. In one embodiment, the overmolded polymer may extend partially or entirely along the bottom of the primer recess 30 or partially or entirely along the side wall of the primer recess 30. The primer recess 30 is sized so as to receive a primer (not shown) in an interference fit during assembly. The primer recess 30 is adapted and sized to allow the positioning of a diffuser (not shown) between the bottom of the primer recess 30 and the primer (not shown) while still allowing proper fitting and operation of the primer (not shown). The diffuser is a diffusion device positioned between the primer bottom and the bottom of the primer recess. The diffuser may be a ring fitted to the primer recess and may be a thickness that is sufficient to diffuse the forces. The primer flash hole 36 communicates through the bottom surface 26 of primer insert 20 into the propellant chamber 18 so that upon detonation of primer (not shown) the powder in propellant chamber 18 will be ignited.

The polymeric cartridge blank 10 extends longer than a finished ammunition cartridge to allow the neck and shoulder to be formed and reduce the case length. To form the neck and shoulder the polymeric cartridge blank 10 is inserted into a die that is configured to have the desired shoulder angle, shoulder length, neck length and neck thickness. The shoulder neck parameters are shown in a FIG. 2.

Figure 2:
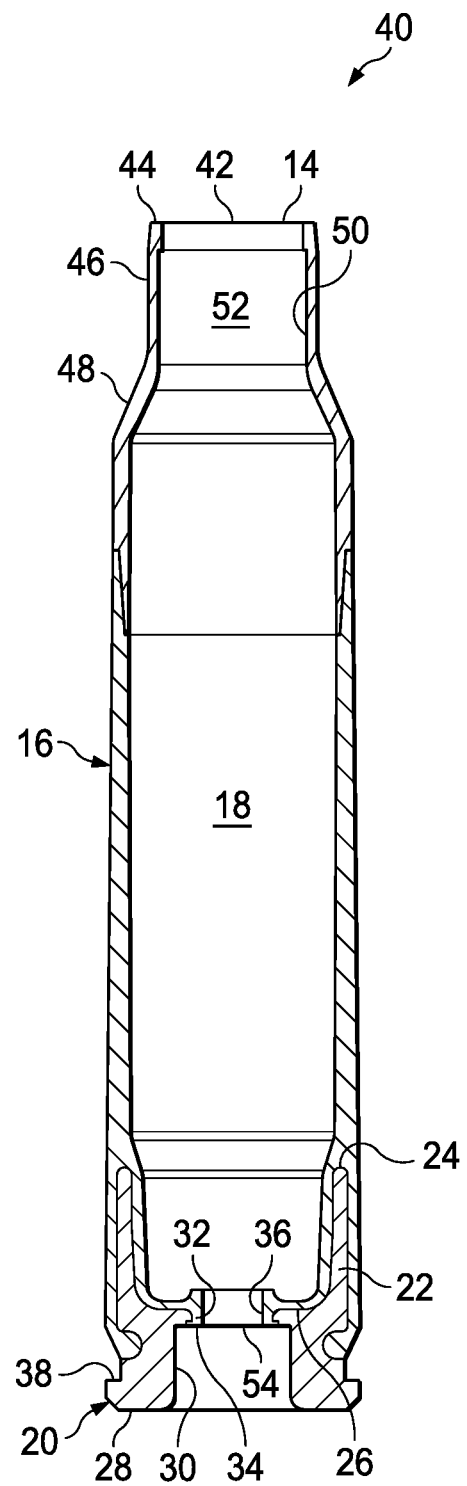
FIG. 2 depicts a partial view of a polymer cartridge illustrating the neck and shoulder relative to the cartridge body.

FIG. 2 depicts a one piece polymeric ammunition cartridge 40 formed from the polymer cartridge blank (not shown) having a neck and a shoulder. When formed into an ammunition cartridge 40 the unformed top end 12 includes a projectile aperture 42 at the rim 44 that extends to a neck 46 that transitions to a shoulder 48. The neck 46 is opposite the internal neck 50 which may include texturing 52. The texturing 52 may independently include one or more selected from etching, grooves, hatching, knurling, a texture, rings, and free formed textures. After the neck (not shown) and shoulder (not shown) are formed the polymeric ammunition cartridge 40 has the same case length as a brass case or a two piece polymeric ammunition case. The polymeric cartridge blank 10 includes a nose end aperture 14 that extends to a middle body 16 which forms a propellant chamber 18 that extends to an overmolded primer insert 20. The unformed top end has been formed into the neck 46 and shoulder 48 and extends from the nose end aperture 14 rearward to a middle body component 16. The middle body component 16 is molded over the primer insert 20. The primer insert 20 includes an insert coupling element 22 extending from a coupling tip 24 to a bottom surface 26 which is opposite a top surface 28. Located in the top surface 28 is a primer recess 30 that extends toward the bottom surface 26. Upon overmolding, the polymer material of the middle body component 16 is molded over the coupling end 22 and the coupling tip 24 to engage the insert coupling element 22 on both the inside and outside. A primer flash hole aperture 32 is located in the primer recess 30 and extends through the bottom surface 26 into the propellant chamber 18. A flash hole groove 34 is positioned around the primer flash hole aperture 32 in the primer recess 30. When overmolded the middle body component 16 extends over the coupling tip 24 into the primer flash hole aperture 32 and into the flash hole groove 34 to form a flash hole 36. The flash hole 36 is a polymer coating over the primer flash hole aperture 32 and allows passage from the primer recess 30 to the propellant chamber 18. The primer insert 20 includes an extraction flange 38 to allow the extraction of the polymeric ammunition cartridge 40 from the chamber (not shown). Insert coupling element 22, as shown may be configured as a male element; however, all combinations of male and female configurations is acceptable and the insert coupling element 22 may be if any length. The flash hole groove 34 may extend partially or entirely along the bottom of the primer recess 30. In other embodiments, the flash hole groove 34 may extend partially or entirely along the side wall of the primer recess 30 to allow the overmolded polymer to extend into the flash hole groove 34 that extend partially or entirely along the side wall of the primer recess 30. In one embodiment, the overmolded polymer may extend partially or entirely along the bottom of the primer recess 30 or partially or entirely along the side wall of the primer recess 30. The primer recess 30 is sized so as to receive the primer (not shown) in an interference fit during assembly. The primer recess 30 is adapted and sized to allow the positioning of a diffuser 54 between the bottom of the primer recess 30 and the primer (not shown) while still allowing proper fitting and operation of the primer (not shown). The primer flash hole 36 communicates through the bottom surface 26 of primer insert 20 into the propellant chamber 18 so that upon detonation of primer (not shown) the powder in propellant chamber 18 will be ignited.

Figure 3:
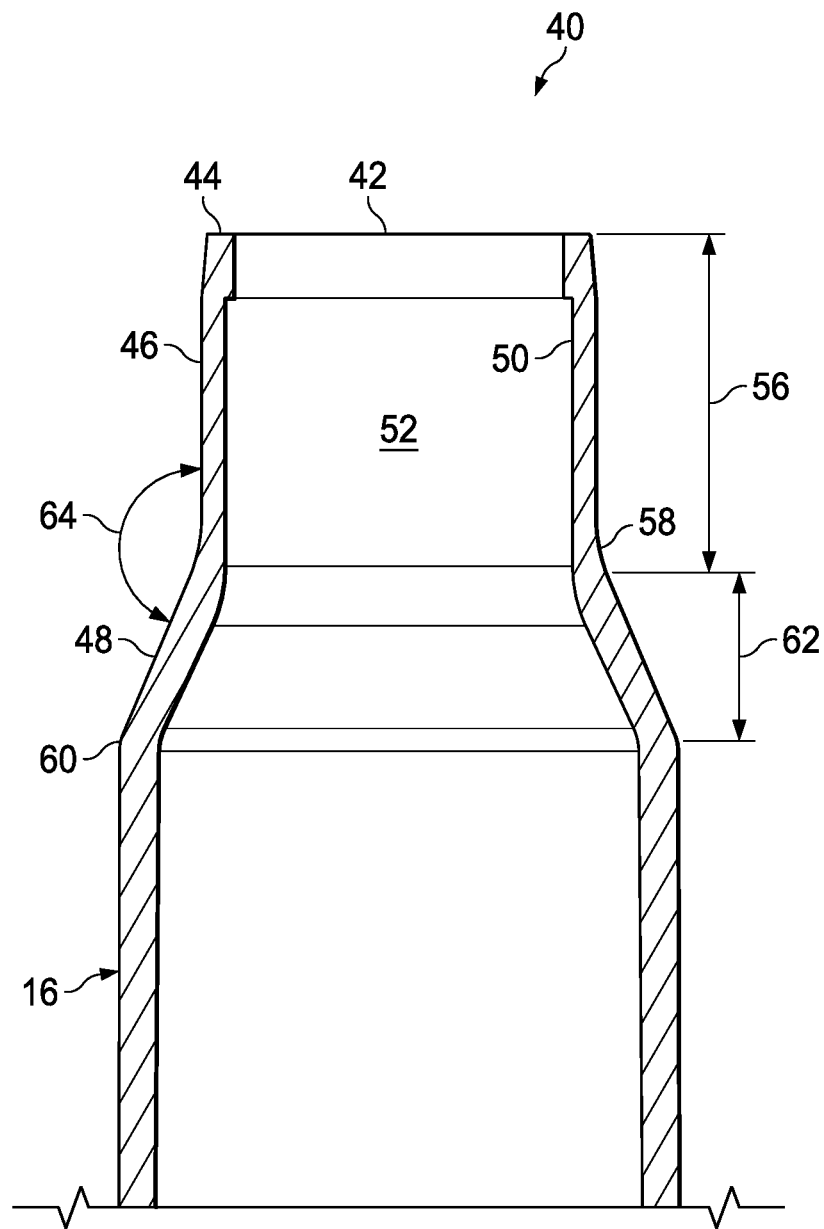
FIG. 3 depicts a partial view of a polymeric ammunition cartridge illustrating the relationship between the neck and the shoulder.

FIG. 3 depicts a partial view of a polymeric ammunition cartridge 40 illustrating the relationship between the neck 46 and the shoulder 48. The polymeric ammunition cartridge 40 includes a projectile aperture 42 at the rim 44 that extends to a neck 46 that transitions to the shoulder 48. The neck 46 is opposite the internal neck 50 which may include texturing 52. The unformed top end 12 is formed into a neck 46 that extends to a shoulder 48 that transitions to the middle body component 16. The shoulder 48 and the neck 46 are a fixed dimension as requires by the chamber (not shown) in which they fit. The neck 46 is defined by a neck length 56 which is defined from the rim 44 to the neck-shoulder transition 58. The shoulder 48 extends from the neck-shoulder transition 58 to the shoulder bottom 60. The shoulder length 62 is defined as the length from the neck-shoulder transition 58 to the shoulder bottom 60. The angle between the neck 46 and the shoulder 48 defines an external shoulder angle 64. The relationship between the neck length 56, the shoulder length 62 and the external shoulder angle 64 are fixed dimensions for a given ammunition caliber that are required for the polymer ammunition cartridge 40 to fit into the chamber (not shown). As a result, the neck length 56, the shoulder length 62 and the external shoulder angle 64 have fixed values to mate them to the chamber and are caliber ammunition and weapons platform specific, which is readily to the skilled artisan from Sporting Arms and Ammunition Manufacturers' Institute and/or military sources.

The present invention uses a mold (also called a form, jig, die, thermal die, thermal form, thermal jig, or shape) to convert a polymer ammunition cartridge blank into a polymer ammunition cartridge by forming a neck and shoulder in the polymer ammunition cartridge blank. The thermal mold is heated to transfer heat to the polymer ammunition cartridge blank which in turn allows the forming of the neck and shoulder in the polymer ammunition cartridge blank. The heat range may be any temperature range from 10 degrees Celsius to 700 degrees Celsius depending on the specific polymer and may be ramped at any thermal gradient necessary to form the neck and shoulder in the polymer ammunition cartridge blank. In addition, the thermal mold may be constructed of multiple portions that are connected to form a single thermal mold. This may be in the form of vertical segments or horizontal segments, e.g., the cartridge cavity, the shoulder segment and the neck segment may be separate segments that are connected to form the thermal mold or the thermal mold may be divided into a left thermal mold segment having a cartridge cavity, the shoulder segment and the neck segment and a right thermal mold segment having a cartridge cavity, the shoulder segment and the neck segment that are connected to form a single thermal mold.

Figure 4:
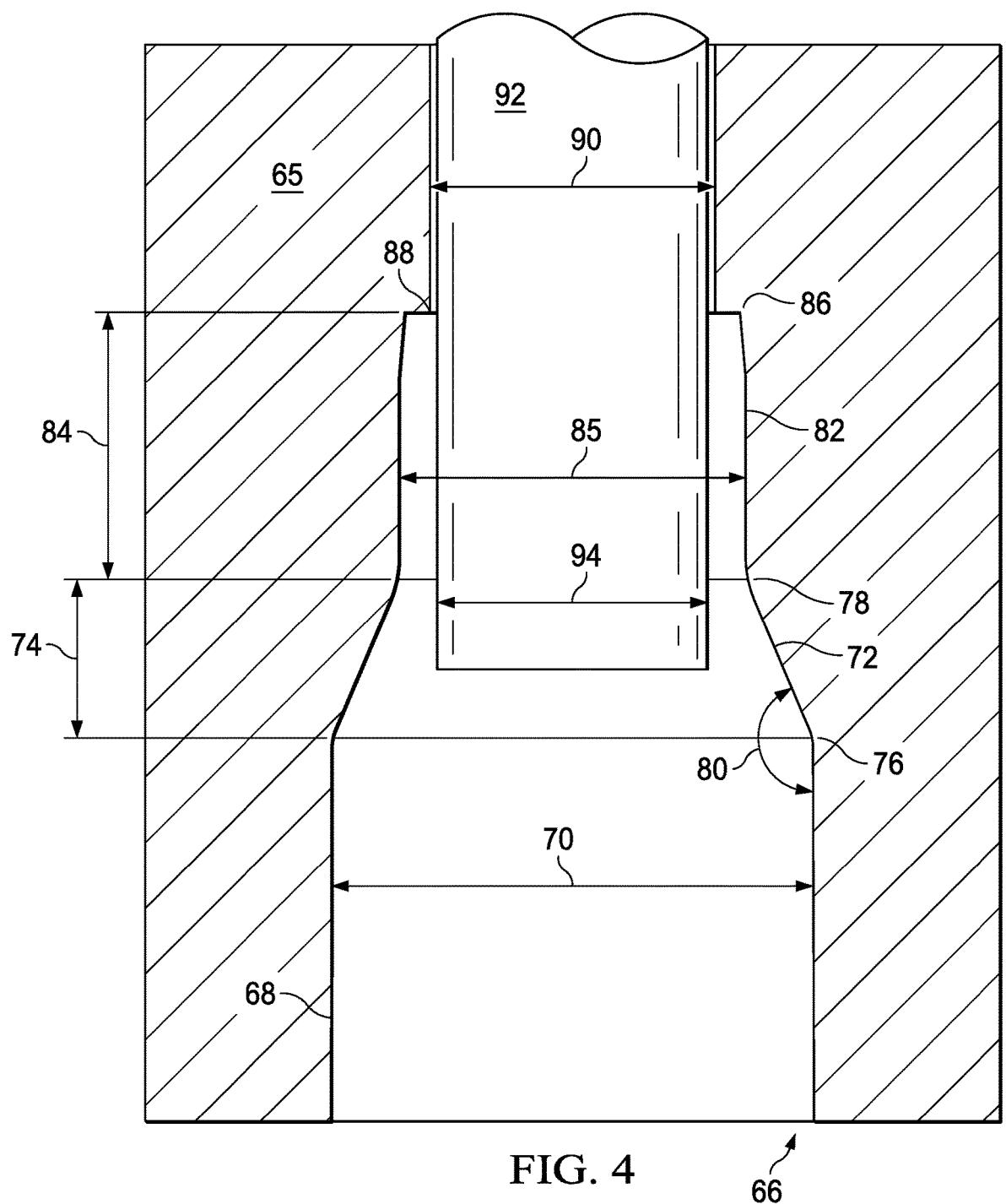
FIG. 4 is an image of the thermal form used to take a polymer cartridge blank and form a one piece polymeric ammunition cartridge.

FIG. 4 is an image of the thermal form used to take a polymer cartridge blank and form it into a one piece polymeric ammunition cartridge (not shown). The form body 65 includes a cartridge cavity 66 that is adapted to accept a polymer cartridge blank 10. The cartridge cavity 66 includes a body segment 68 having a body segment diameter 70. The cartridge cavity 66 includes a shoulder segment 72 connected to the body segment 68. The shoulder segment 72 includes a shoulder segment length 74 defined from the body segment transition 76 to the neck segment transition 78. The shoulder segment angle 80 is defined as the angle formed between the body segment 68 and the shoulder segment 72. The cartridge cavity 66 includes a neck segment 82 connected to the shoulder segment 72. The neck segment 82 includes a neck segment length 84 and a neck segment diameter 85 that extends from the neck segment transition 78 to the neck segment end 86. The nose segment end 86 extends to the tip segment end 88 to define the neck thickness. The projectile aperture diameter 90 is adapted to fit a projectile (not shown) and is defined as the length separating tip segment end 88. A mandrel 92 having a mandrel diameter 94 that is less than the projectile aperture diameter 90 allows the movement of the mandrel 92 into the neck segment 82 to form the projectile aperture (not shown) in the polymeric ammunition cartridge (not shown). The form body 65 includes a cartridge cavity 66 that is adapted to accept a polymer cartridge blank (not shown) to form the shoulder (not shown) and neck (not shown) into a polymeric ammunition cartridge (not shown). The form body 65 adjusts the body segment diameter 70, the shoulder segment length 74 in conjunction with the neck segment diameter 85 and neck segment length 84 to define a mold/form shape that corresponds to the desired ammunition cartridge, e.g., .17 HMR, .17 Hornet, .17 Ackley Hornet, .17 Winchester Super Magnum, .17-32 Magnum, .17 VHA, .17 Remington, .17/222, 0.17 Mach .17 Ackley Improved Bee, .17-357 RG, .17 Remington Fireball, .17 Incinerator, 4.39×39Rmm SPS, .204 Ruger, 5 mm Remington Rimfire Magnum, 5.45×39 mm Russian family, .22 Short, .22 Long, .22 Long Rifle, .22 Stinger, 22 Extra Long, .297/230 Morris Extra Long, .22 Hornet, .22 Rem Automatic, 5.66×39 MPS, .22 Rem Jet, .218 Bee, .219 Zipper, .22 Hornet-K, .220 Swift, .222 Remington, .222 Remington Magnum, .223 Remington, 5.56×45 mm NATO, 5.7×28 mm, .22 TCM, 5.8×42 Chinese, .224 Weatherby Magnum, .225 Winchester, .223 Winchester Super Short Magnum (Obsolete) .223 Ackley Improved, .219 Donaldson Wasp, .221 Remington Fireball, .22-250 Remington and many more, .243 Winchester, .244 Remington, 6 mm Remington, 6 mm plastic airsoft BBs, 6 mm Whisper, 6 mm PPC, 6 mm Bench Rest Remington, 6×45 mm, 6×47 mm, 6 mm Cheetah, .240 Weatherby, 6×62 Freres, 6 mm Norma BR, 6XC Tubb, 6 mm JDJ, 6 mm SAW, 6-250 Walker, 6.17 Spitfire, 6.17 Flash, 6 mm Lee Navy, and more, .25 ACP (.251"), 250/3000 Savage, 257 Roberts, 25-06 (.257"), 6.5×55 mm, .260 Remington, 26 Nosler, 6.5 Creedmoor, 6.5×47 Lapua, .270 Winchester, 6.8 SPC, .280 Remington, 7 mm-08 Remington, 7 mm Remington Magnum, 7×57 mm Mauser, 7×64 mm, .30 Luger (7.65×21 mm Luger), .30-30 Win, 30 Herrett, .300 Whisper, .30-378 Weatherby, 7.63 Mannlicher-Schoenauer, 7.63 Mauser, .30 USA Rimless, .308 Corbon, .3-9 Savage, .30 Kurz, 300 AAC Blackout (7.62×35 mm), 7.5 mm Schmidt-Rubin, .300 Winchester Magnum, .30 Carbine, 309 JDJ, .30-03, 0.30-06 Springfield, .30-06 JDJ, .307 GNR, .308 Winchester (7.62×51 mm NATO), .300 Weatherby Magnum, .30 Army (.30-40 Krag), 7.82 mm Lazzeroni, and dozens more, .303 British, 7.62×39 mm Soviet, 7.62×54 mmR, 7.62×25 mm, 7.7×58 mm, .32 ACP, 8×57 mm IS, .325 WSM, 8 mm Remington Magnum, 8 mm plastic (airsoft) BBs, .338 Lapua, .338 Norma Magnum, .338 Winchester Magnum, .338-378 Weatherby Magnum, 9 mm Luger, 9 mm Ultra, 9 mm Bayard Long, 9 mm Browning Long, 9 mm Mauser, 9 mm Winchester Magnum, 9 mm Glisenti, 9×21 mm, 9×23 mm Winchester, 9 mm Mi-Bullet, 9 mm Steyr, .356 Team Smith & Wesson, 9 mm Federal, 9 mm×25 mm Dillon, 9 mm Action Express, .380 ACP (9 mm Short), 9×56 mm Mannlicher-Schoenauer, 9 mm×57 mm Mauser, .38 Super, .38 Special, .357 Magnum, .357 SIG, .35 Remington, 9×18 mm Makarov, 9.3×62 mm, 9.3×64 mm Brenneke, 9.3×72 mmR, 9.3×74 mm, .375 H&H Magnum, 9.5×57 mm Mannlicher-Schönauer (.375 Rimless Nitro Express (RNE)×2¼), .40 S&W, 10 mm Auto, .444 Marlin, .44 S&W Russian, .44 S&W Special, .44 Remington Magnum, .44 Auto Mag, .440 Cor-Bon, 44/454 JDJ Woodswalker, .45 ACP, .45 GAP, .454 Casull, .45 Long Colt, .455 Webley, .50 BMG, .50 Action Express, 12.7×108 mm and variations thereof.

Figure 5:
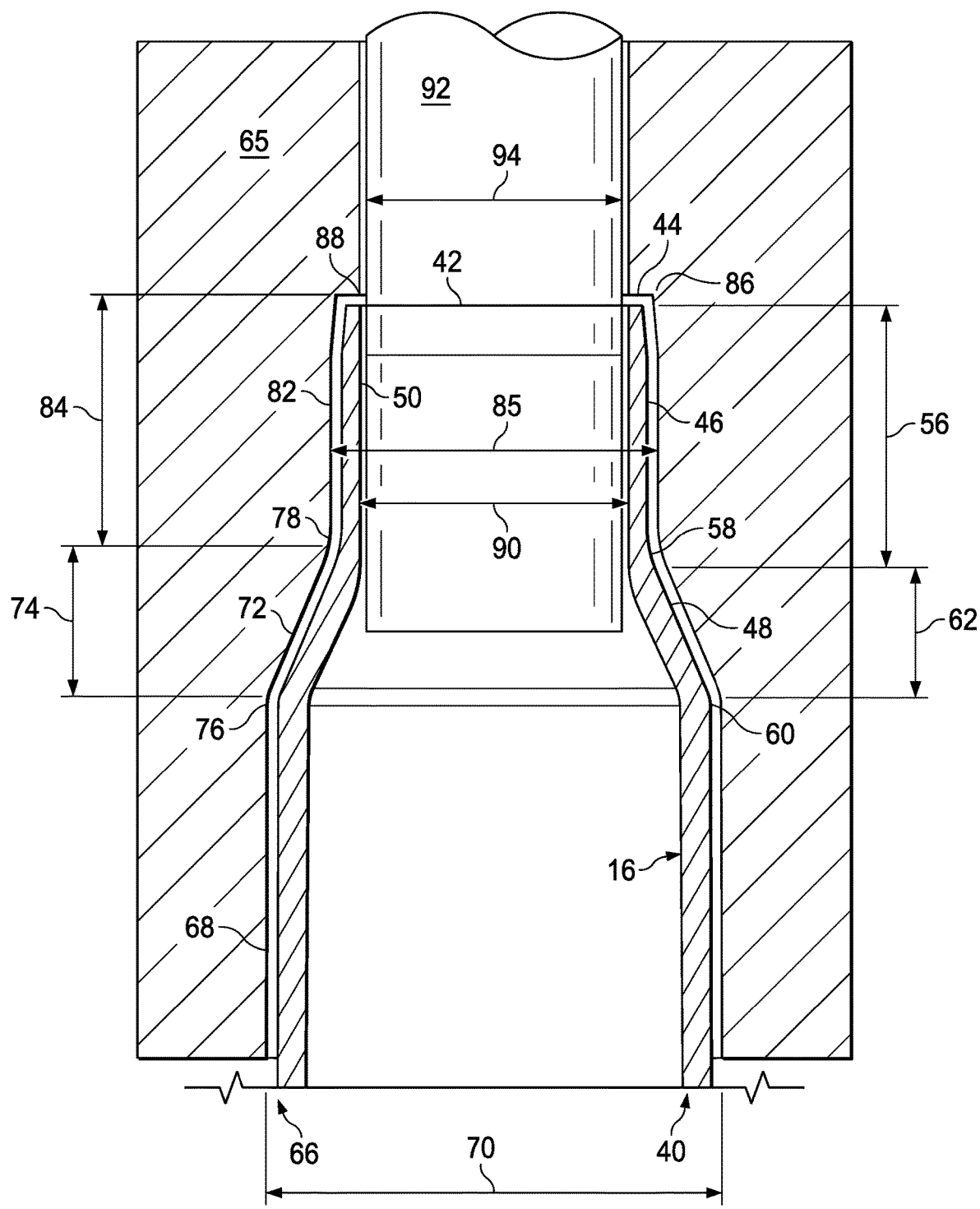
FIG. 5 is an image of the thermal form with a polymer cartridge blank formed into a one piece polymeric ammunition cartridge.

FIG. 5 is an image of the thermal form with a polymer cartridge blank formed into a one piece polymeric ammunition cartridge. The form body 65 includes a cartridge cavity 66 that is adapted to accept a polymer cartridge blank. The cartridge cavity 66 includes a body segment 68 having a body segment diameter 70. The cartridge cavity 66 includes a shoulder segment 72 connected to the body segment 68. The shoulder segment 72 includes a shoulder segment length 74 defined from the body segment transition 76 to the neck segment transition 78. The shoulder segment angle 80 is defined as the angle formed between the body segment 68 and the shoulder segment 72. The cartridge cavity 66 includes a neck segment 82 connected to the shoulder segment 72. The neck segment 82 includes a neck segment length 84 and a neck segment diameter 85 that extends from the neck segment transition 78 to the nose segment end 86. The nose segment end 86 extends to the tip segment end 88 to define the neck thickness. The projectile aperture diameter 90 is adapted to fit a projectile and is defined as the length separating tip segment end 88. A mandrel 92 having a mandrel diameter 94 that is less than the projectile aperture diameter 90 allows the mandrel 92 to move into the neck segment 82 to form the projectile aperture in the polymeric ammunition cartridge. The form body 65 includes a cartridge cavity 66 that is adapted to accept a polymer cartridge blank (not shown) and forms the shoulder and neck into a polymeric ammunition cartridge by pressing the polymer cartridge blank into the form body 65. The polymer cartridge blank adapts to the shape of the form body 65 to form a polymeric ammunition cartridge 40. The polymeric ammunition cartridge 40 includes a projectile aperture 42 at the rim 44 that extends to a neck 46 that transitions to the shoulder 48. The neck 46 is opposite the internal neck 50 which may include texturing (not shown). The unformed top end is formed into a neck 46 that extends to a shoulder that transitions to the middle body component 16. The neck 46 is defined by a neck length 56 which is defined from the rim 44 to the neck-shoulder transition 58. The shoulder 48 extends from the neck-shoulder transition 58 to the shoulder bottom 60. The shoulder length 62 is defined as the length from the neck-shoulder transition 58 to the shoulder bottom 60. The angle between the neck 46 and the shoulder 48 defines an external shoulder angle 64. The relationship between the neck length 56, the shoulder length 62 and the external shoulder angle 64 are fixed dimension for a given ammunition caliber that are required for the polymer ammunition cartridge 40 to fit into the chamber (not shown). As a result, the neck length 56, the shoulder length 62 and the external shoulder angle 64 have fixed values to mate them to the chamber and are caliber ammunition and weapons platform. The form body 65 adjusts the body segment diameter 70, the shoulder segment length 74 in conjunction with the neck segment diameter 85 and neck segment length 84 to define the mold/form shape that corresponds to the desired ammunition cartridge 40 in the specific caliber, e.g., .17 HMR, .17 Hornet, .17 Ackley Hornet, .17 Winchester Super Magnum, .17-32 Magnum, .17 VHA, .17 Remington, .17/222, 0.17 Mach .17 Ackley Improved Bee, .17-357 RG, .17 Remington Fireball, .17 Incinerator, 4.39×39 Rmm SPS, .204 Ruger, 5 mm Remington Rimfire Magnum, 5.45×39 mm Russian family, .22 Short, .22 Long, .22 Long Rifle, .22 Stinger, 22 Extra Long, .297/230 Morris Extra Long, .22 Hornet, .22 Rem Automatic, 5.66×39 MPS, .22 Rem Jet, .218 Bee, .219 Zipper, .22 Hornet-K, .220 Swift, .222 Remington, .222 Remington Magnum, .223 Remington, 5.56×45 mm NATO, 5.7×28 mm, .22 TCM, 5.8×42 Chinese, .224 Weatherby Magnum, .225 Winchester, .223 Winchester Super Short Magnum (Obsolete) .223 Ackley Improved, .219 Donaldson Wasp, .221 Remington Fireball, .22-250 Remington and many more, .243 Winchester, .244 Remington, 6 mm Remington, 6 mm plastic airsoft BBs, 6 mm Whisper, 6 mm PPC, 6 mm Bench Rest Remington, 6×45 mm, 6×47 mm, 6 mm Cheetah, .240 Weatherby, 6×62 Freres, 6 mm Norma BR, 6XC Tubb, 6 mm JDJ, 6 mm SAW, 6-250 Walker, 6.17 Spitfire, 6.17 Flash, 6 mm Lee Navy, and more, .25 ACP (.251"), 250/3000 Savage, 257 Roberts, 25-06 (.257"), 6.5×55 mm, .260 Remington, 26 Nosler, 6.5 Creedmoor, 6.5×47 Lapua, .270 Winchester, 6.8 SPC, .280 Remington, 7 mm-08 Remington, 7 mm Remington Magnum, 7×57 mm Mauser, 7×64 mm, .30 Luger (7.65×21 mm Luger), .30-30 Win, 30 Herrett, .300 Whisper, .30-378 Weatherby, 7.63 Mannlicher-Schoenauer, 7.63 Mauser, .30 USA Rimless, .308 Corbon, .3-9 Savage, .30 Kurz, 300 AAC Blackout (7.62×35 mm), 7.5 mm Schmidt-Rubin, .300 Winchester Magnum, .30 Carbine, 309 JDJ, .30-03, 0.30-06 Springfield, .30-06 JDJ, .307 GNR, .308 Winchester (7.62×51 mm NATO), .300 Weatherby Magnum, .30 Army (.30-40 Krag), 7.82 mm Lazzeroni, and dozens more, .303 British, 7.62×39 mm Soviet, 7.62×54 mmR, 7.62×25 mm, 7.7×58 mm, .32 ACP, 8×57 mm IS, .325 WSM, 8 mm Remington Magnum, 8 mm plastic (airsoft) BBs, .338 Lapua, .338 Norma Magnum, .338 Winchester Magnum, .338-378 Weatherby Magnum, 9 mm Luger, 9 mm Ultra, 9 mm Bayard Long, 9 mm Browning Long, 9 mm Mauser, 9 mm Winchester Magnum, 9 mm Glisenti, 9×21 mm, 9×23 mm Winchester, 9 mm Mi-Bullet, 9 mm Steyr, .356 Team Smith & Wesson, 9 mm Federal, 9 mm×25 mm Dillon, 9 mm Action Express, .380 ACP (9 mm Short), 9×56 mm Mannlicher-Schoenauer, 9 mm×57 mm Mauser, .38 Super, .38 Special, .357 Magnum, .357 SIG, .35 Remington, 9×18 mm Makarov, 9.3×62 mm, 9.3×64 mm Brenneke, 9.3×72 mmR, 9.3×74 mm, .375 H&H Magnum, 9.5×57 mm Mannlicher-Schönauer (.375 Rimless Nitro Express (RNE)×2¼), .40 S&W, 10 mm Auto, .444 Marlin, .44 S&W Russian, .44 S&W Special, .44 Remington Magnum, .44 Auto Mag, .440 Cor-Bon, 44/454 JDJ Woodswalker, .45 ACP, .45 GAP, .454 Casull, .45 Long Colt, .455 Webley, .50 BMG, .50 Action Express, 12.7×108 mm and variations thereof. In addition, the polymer cartridge blank may be pressurized or cooled by gas when the polymer cartridge blank is in the thermal form. The polymer cartridge blank may be cooled or pressurized by inputting gas through the primer recess. When the mandrel is in place the polymer cartridge blank may be pressurized through the addition of gas through the primer pocket. Similarly, the mandrel may be cooled with a fluid or a gas alone or in combination with the gas flow or pressurization of the polymer cartridge blank. In some instances, the pressurization may be operated in the form of blow molding. The polymer cartridge blank may be placed in the form while pressured and formed into a polymer cartridge ammunition blank.

Figure 6A:
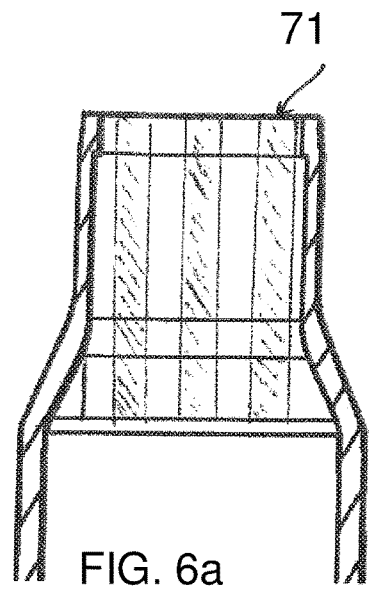
FIGS. 6a-6m depicts a side, cross-sectional view of a bullet-end component of the polymeric cartridge casing illustrating various textured surface.
Figure 6B:
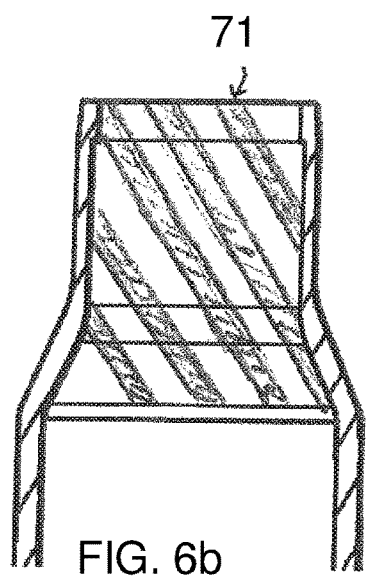
Figure 6C:
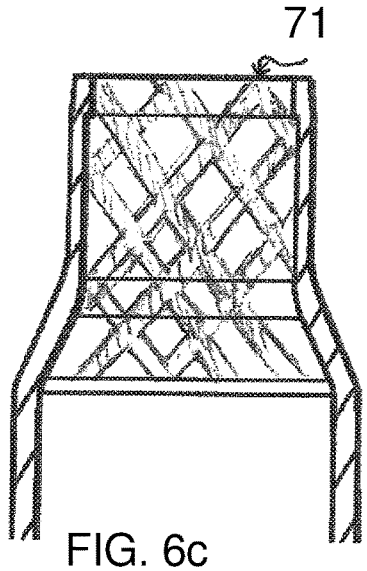
Figure 6D:
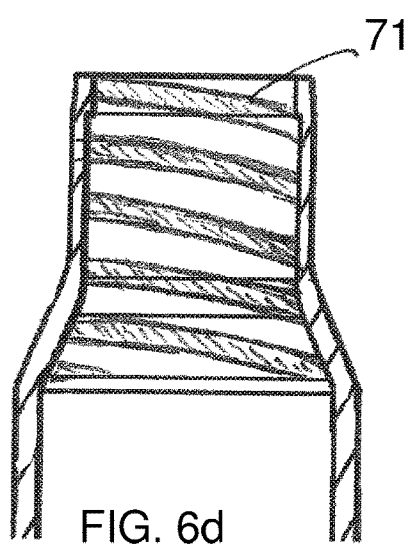
Figure 6E:
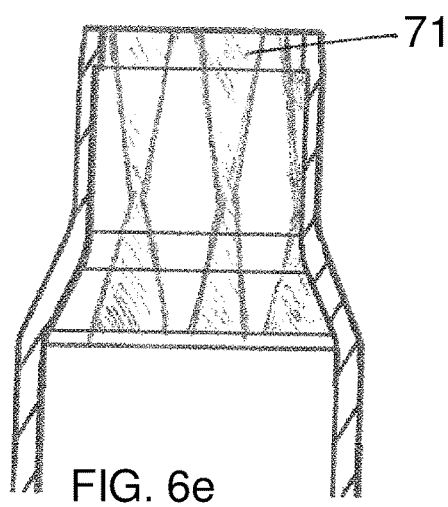
Figure 6F:
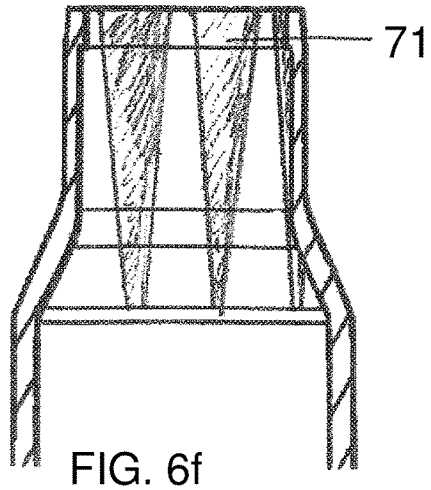
Figure 6G:
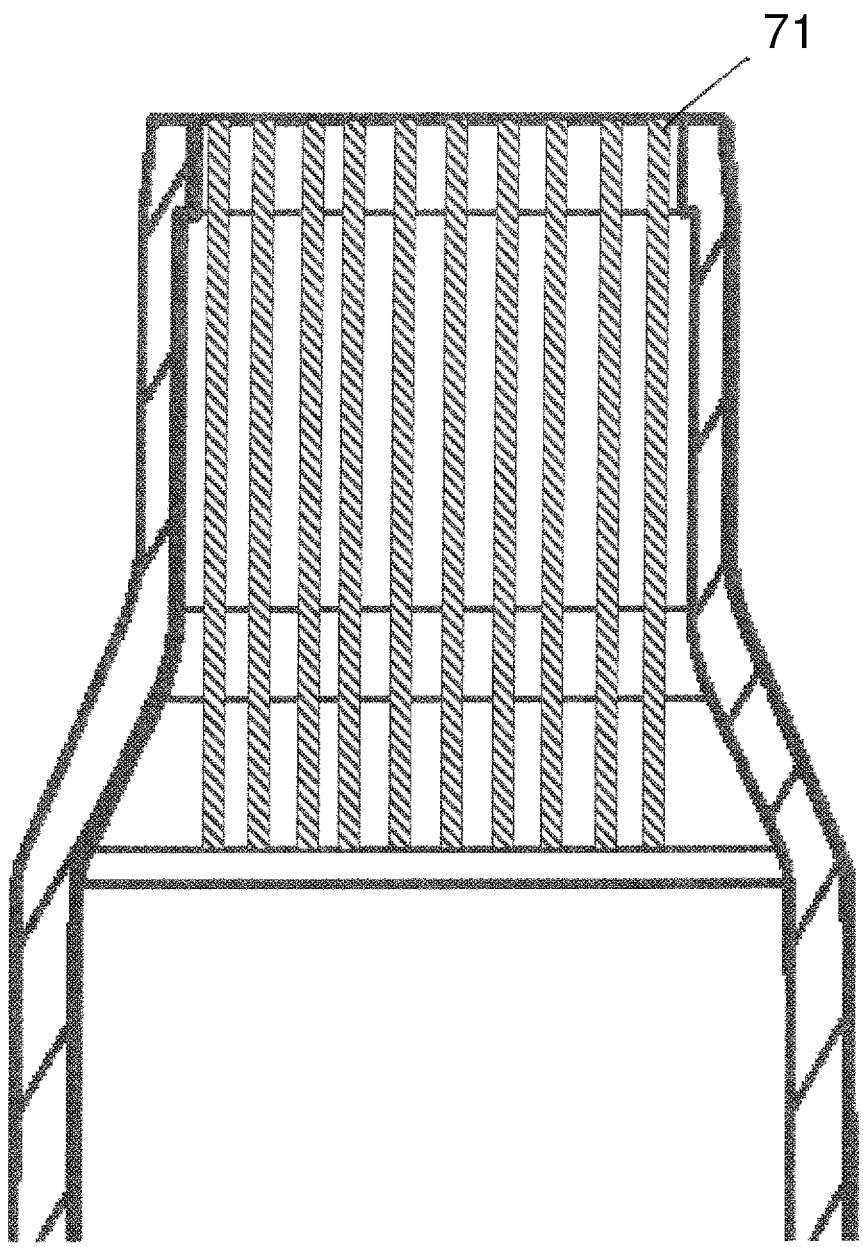
Figure 6H:
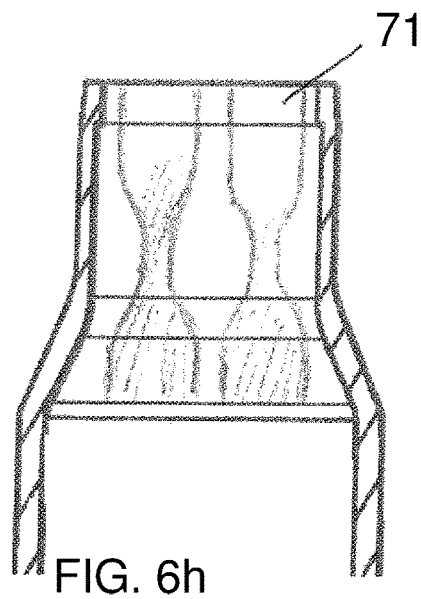
Figure 6I:
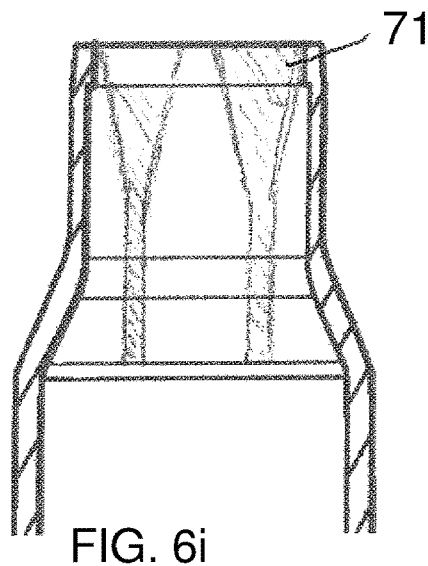
Figure 6J:
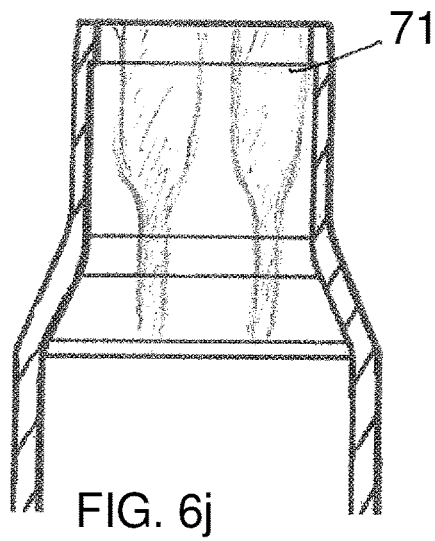
Figure 6K:
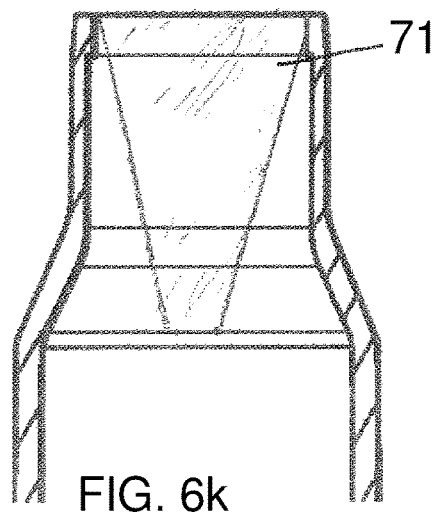
Figure 6L:
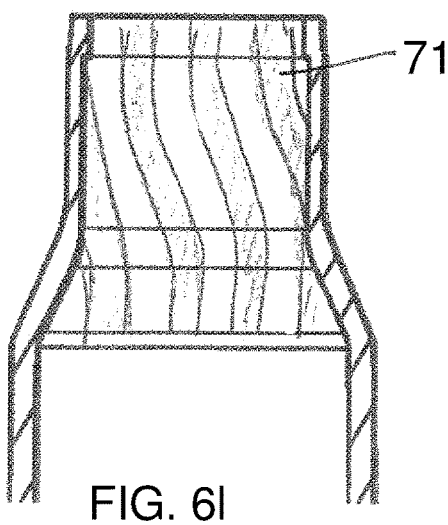
Figure 6M:
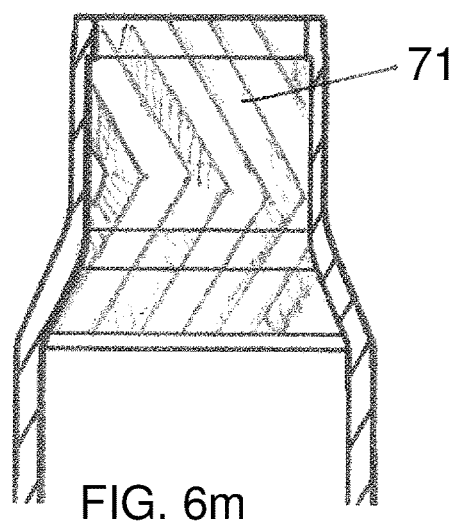

FIGS. 6a-6m depicts a side, cross-sectional view of a bullet-end component of the polymeric cartridge casing illustrating various textured surface. FIGS. 6a, 6b and 6g depict a side, cross-sectional view of a bullet-end component of the polymeric cartridge casing illustrating groove textured surface. FIG. 6c depict a side, cross-sectional view of a bullet-end component of the polymeric cartridge casing illustrating a hatching or knurling textured surface. FIG. 6d depict a side, cross-sectional view of a bullet-end component of the polymeric cartridge casing illustrating a ring textured surface. FIGS. 6e, 6f, 6h, 6i, 6j, and 6k depict a side, cross-sectional view of a bullet-end component of the polymeric cartridge casing illustrating a free formed textured surface.

The primer insert includes an individual upper primer insert portion and lower primer insert portion that may be in the form of 1, 2, or 3 insert pieces connected to form a primer insert. The primer insert and (when in multiple portions) the primer insert portion each may be independently formed by molding, injection molding, metal injection molding, cold forming, forming, milling, machining, additive manufacturing, printing, 3D printing, or a combination thereof. For example, when the primer insert or the individual upper primer insert portion and lower primer insert portion are metal injection molded, the raw materials are metal powders and a thermoplastic binder. There are at least two binders included in the blend, a primary binder and a secondary binder. This blended powder mix is worked into the plasticized binder at elevated temperature in a kneader or shear roll extruder. The intermediate product is the so-called feedstock. It is usually granulated with granule sizes of several millimeters. In metal injection molding, only the binders are heated up, and that is how the metal is carried into the mold cavity. In preparing a feedstock, it is important first to measure the actual density of each lot of both the metal powders and binders. This is extremely important especially for the metal powders in that each lot will be different based on the actual chemistry of that grade of powder. For example, 316L is comprised of several elements, such as Fe, Cr, Ni, Cu, Mo, P, Si, S and C. In order to be rightfully called a 316L, each of these elements must meet a minimum and maximum percentage weight requirement as called out in the relevant specification. Hence the variation in the chemistry within the specification results in a significant density variation within the acceptable composition range. Depending on the lot received from the powder producer, the density will vary depending on the actual chemistry received. The insert regardless of method of manufacturing may comprise metals, alloys, polymers or combinations thereof, e.g., low alloy steels 2200, 2700, 4605, 316L, 420, 430L, 17-4, 17-4PH, 17-7, F15, Fe-3% Si, Fe-50% Ni, and Fe-50% Co. In addition to the specific metal compositions may include common commercial designations e.g., C-0000 Copper and Copper Alloys; CFTG-3806-K Diluted Bronze Bearings; CNZ-1818 Copper and Copper Alloys; CNZP-1816 Copper and Copper Alloys; CT-1000 Copper and Copper Alloys; CT-1000-K Bronze Bearings; CTG-1001-K Bronze Bearings; CTG-1004-K Bronze Bearings; CZ-1000 Copper and Copper Alloys; CZ-2000 Copper and Copper Alloys; CZ-3000 Copper and Copper Alloys; CZP-1002 Copper and Copper Alloys; CZP-2002 Copper and Copper Alloys; CZP-3002 Copper and Copper Alloys; F-0000 Iron and Carbon Steel; F-0000-K Iron and Iron-Carbon Bearings; F-0005 Iron and Carbon Steel; F-0005-K Iron and Iron-Carbon Bearings; F-0008 Iron and Carbon Steel; F-0008-K Iron and Iron-Carbon Bearings; FC-0200 Iron-Copper and Copper Steel; FC-0200-K Iron-Copper Bearings; FC-0205 Iron-Copper and Copper Steel; FC-0205-K Iron-Copper-Carbon Bearings; FC-0208 Iron-Copper and Copper Steel; FC-0208-K Iron-Copper-Carbon Bearings; FC-0505 Iron-Copper and Copper Steel; FC-0508 Iron-Copper and Copper Steel; FC-0508-K Iron-Copper-Carbon Bearings; FC-0808 Iron-Copper and Copper Steel; FC-1000 Iron-Copper and Copper Steel; FC-1000-K Iron-Copper Bearings; FC-2000-K Iron-Copper Bearings; FC-2008-K Iron-Copper-Carbon Bearings; FCTG-3604-K Diluted Bronze Bearings; FD-0200 Diffusion-Alloyed Steel; FD-0205 Diffusion-Alloyed Steel; FD-0208 Diffusion-Alloyed Steel; FD-0400 Diffusion-Alloyed Steel; FD-0405 Diffusion-Alloyed Steel; FD-0408 Diffusion-Alloyed Steel; FF-0000 Soft-Magnetic Alloys; FG-0303-K Iron-Graphite Bearings; FG-0308-K Iron-Graphite Bearings; FL-4005 Pre-alloyed Steel; FL-4205 Preralloyed Steel; FL-4400 Prealloyed Steel; FL-4405 Prealloyed Steel; FL-4605 Prealloyed Steel; FL-4805 Prealloyed Steel; FL-48105 Prealloyed Steel; FL-4905 Prealloyed Steel; FL-5208 Prealloyed Steel; FL-5305 Prealloyed Steel; FLC-4608 Sinter-Hardened Steel; FLC-4805 Sinter-Hardened Steel; FLC-48108 Sinter-Hardened Steel; FLC-4908 Sinter-Hardened Steel; FLC2-4808 Sinter-Hardened Steel; FLDN2-4908 Diffusion-Alloyed Steel; FLDN4C2-4905 Diffusion-Alloyed Steel; FLN-4205 Hybrid Low-Alloy Steel; FLN-48108 Sinter-Hardened Steel; FLN2-4400 Hybrid Low-Alloy Steel; FLN2-4405 Hybrid Low-Alloy Steel; FLN2-4408 Sinter-Hardened Steel; FLN2C-4005 Hybrid Low-Alloy Steel; FLN4-4400 Hybrid Low-Alloy Steel; FLN4-4405 Hybrid Low-Alloy Steel; FLN4-4408 Sinter Hardened Steel; FLN4C-4005 Hybrid Low-Alloy Steel; FLN6-4405 Hybrid Low-Alloy Steel; FLN6-4408 Sinter-Hardened Steel; FLNC-4405 Hybrid Low-Alloy Steel; FLNC-4408 Sinter-Hardened Steel; FN-0200 Iron-Nickel and Nickel Steel; FN-0205 Iron-Nickel and Nickel Steel; FN-0208 Iron-Nickel and Nickel Steel; FN-0405 Iron-Nickel and Nickel Steel; FN-0408 Iron-Nickel and Nickel Steel; FN-5000 Soft-Magnetic Alloys; FS-0300 Soft-Magnetic Alloys; FX-1000 Copper-Infiltrated Iron and Steel; FX-1005 Copper-Infiltrated Iron and Steel; FX-1008 Copper-Infiltrated Iron and Steel; FX-2000 Copper-Infiltrated Iron and Steel; FX-2005 Copper-Infiltrated Iron and Steel; FX-2008 Copper-Infiltrated Iron and Steel; FY-4500 Soft-Magnetic Alloys; FY-8000 Soft-Magnetic Alloys; P/F-1020 Carbon Steel PF; P/F-1040 Carbon Steel PF; P/F-1060 Carbon Steel PF; P/F-10C40 Copper Steel PF; P/F-10050 Copper Steel PF; P/F-10060 Copper Steel PF; P/F-1140 Carbon Steel PF; P/F-1160 Carbon Steel PF; P/F-11C40 Copper Steel PF; P/F-11050 Copper Steel PF; P/F-11060 Copper Steel PF; P/F-4220 Low-Alloy P/F-42XX Steel PF; P/F-4240 Low-Alloy P/F-42XX Steel PF; P/F-4260 Low-Alloy P/F-42XX Steel PF; P/F-4620 Low-Alloy P/F-46XX Steel PF; P/F-4640 Low-Alloy P/F-46XX Steel PF; P/F-4660 Low-Alloy P/F-46XX Steel PF; P/F-4680 Low-Alloy P/F-46XX Steel PF; SS-303L Stainless Steel—300 Series Alloy; SS-303N1 Stainless Steel—300 Series Alloy; SS-303N2 Stainless Steel—300 Series Alloy; SS-304H Stainless Steel—300 Series Alloy; SS-304L Stainless Steel—300 Series Alloy; SS-304N1 Stainless Steel—300 Series Alloy; SS-304N2 Stainless Steel—300 Series Alloy; SS-316H Stainless Steel—300 Series Alloy; SS-316L Stainless Steel—300 Series Alloy; SS-316N1 Stainless Steel—300 Series Alloy; SS-316N2 Stainless Steel—300 Series Alloy; SS-409L Stainless Steel—400 Series Alloy; SS-409LE Stainless Steel—400 Series Alloy; SS-410 Stainless Steel—400 Series Alloy; SS-410L Stainless Steel—400 Series Alloy; SS-430L Stainless Steel—400 Series Alloy; SS-430N2 Stainless Steel—400 Series Alloy; SS-434L Stainless Steel—400 Series Alloy; SS-434LCb Stainless Steel—400 Series Alloy; and SS-434N2 Stainless Steel—400 Series Alloy. Titanium alloys that may be used in this invention include any alloy or modified alloy known to the skilled artisan including titanium grades 5-38 and more specifically titanium grades 5, 9, 18, 19, 20, 21, 23, 24, 25, 28, 29, 35, 36 or 38. Grades 5, 23, 24, 25, 29, 35, or 36 annealed or aged; Grades 9, 18, 28, or 38 cold-worked and stress-relieved or annealed; Grades 9, 18, 23, 28, or 29 transformed-beta condition; and Grades 19, 20, or 21 solution-treated or solution-treated and aged. Grade 5, also known as Ti6A14V, Ti-6Al-4V or Ti 6-4, is the most commonly used alloy. It has a chemical composition of 6% aluminum, 4% vanadium, .25% (maximum) iron, .2% (maximum) oxygen, and the remainder titanium. It is significantly stronger than commercially pure titanium while having the same stiffness and thermal properties (excluding thermal conductivity, which is about 60% lower in Grade 5 Ti than in CP Ti); Grade 6 contains 5% aluminum and 2.5% tin. It is also known as Ti-5Al-2.5Sn. This alloy has good weldability, stability and strength at elevated temperatures; Grade 7 and 7H contains .12 to .25% palladium. This grade is similar to Grade 2. The small quantity of palladium added gives it enhanced crevice corrosion resistance at low temperatures and high pH; Grade 9 contains 3.0% aluminum and 2.5% vanadium. This grade is a compromise between the ease of welding and manufacturing of the "pure" grades and the high strength of Grade 5; Grade 11 contains .12 to .25% palladium; Grade 12 contains .3% molybdenum and .8% nickel; Grades 13, 14, and 15 all contain .5% nickel and .05% ruthenium; Grade 16 contains .04 to .08% palladium; Grade 16H contains .04 to .08% palladium; Grade 17 contains .04 to .08% palladium; Grade 18 contains 3% aluminum, 2.5% vanadium and .04 to .08% palladium; Grade 19 contains 3% aluminum, 8% vanadium, 6% chromium, 4% zirconium, and 4% molybdenum; Grade 20 contains 3% aluminum, 8% vanadium, 6% chromium, 4% zirconium, 4% molybdenum and .04% to .08% palladium; Grade 21 contains 15% molybdenum, 3% aluminum, 2.7% niobium, and .25% silicon; Grade 23 contains 6% aluminum, 4% vanadium, .13% (maximum) Oxygen; Grade 24 contains 6% aluminum, 4% vanadium and .04% to .08% palladium. Grade 25 contains 6% aluminum, 4% vanadium and .3% to .8% nickel and .04% to .08% palladium; Grades 26, 26H, and 27 all contain .08 to .14% ruthenium; Grade 28 contains 3% aluminum, 2.5% vanadium and .08 to .14% ruthenium; Grade 29 contains 6% aluminum, 4% vanadium and .08 to .14% ruthenium; Grades 30 and 31 contain .3% cobalt and .05% palladium; Grade 32 contains 5% aluminum, 1% tin, 1% zirconium, 1% vanadium, and .8% molybdenum; Grades 33 and 34 contain .4% nickel, .015% palladium, .025% ruthenium, and .15% chromium; Grade 35 contains 4.5% aluminum, 2% molybdenum, 1.6% vanadium, .5% iron, and .3% silicon; Grade 36 contains 45% niobium; Grade 37 contains 1.5% aluminum; and Grade 38 contains 4% aluminum, 2.5% vanadium, and 1.5% iron. The mechanical properties are very similar to Grade 5, but has good cold workability similar to grade 9. One embodiment includes a Ti6A14V composition. One embodiment includes a composition having 3-12% aluminum, 2-8% vanadium, .1-.75% iron, .1-.5% oxygen, and the remainder titanium. More specifically, about 6% aluminum, about 4% vanadium, about .25% iron, about .2% oxygen, and the remainder titanium. For example, one Ti composition may include 10 to 35% Cr, .05 to 15% Al, .05 to 2% Ti, .05 to 2% $Y_2O_5$, with the balance being either Fe, Ni or Co, or an alloy consisting of 20±1.0% Cr, 4.5±0.5% Al, .5±0.1% $Y_2O_5$ or $ThO_2$, with the balance being Fe. For example, one Ti composition may include 15.0-23.0% Cr, .5-2.0% Si, .0-4.0% Mo, .0-1.2% Nb, .0-3.0% Fe, .0-.5% Ti, .0-.5% Al, .0-.3% Mn, .0-.1% Zr, .0-.035% Ce, .005-.025% Mg, .0005-.005% B, .005-.3% C, .0-20.0% Co, balance Ni. Sample Ti-based feedstock component includes 0-45% metal powder; 15-40% binder; 0-10% Polymer (e.g., thermoplastics and thermosets); surfactant 0-3%; lubricant 0-3%; sintering aid 0-1%. Another sample Ti-based feedstock component includes about 62% TiH2 powder as a metal powder; about 29% naphthalene as a binder; about 2.1-2.3% polymer (e.g., EVA/epoxy); about 2.3% SURFONIC N-100® as a Surfactant; lubricant is 1.5% stearic acid as a; about .4% silver as a sintering Aid. Examples of metal compounds include metal hydrides, such as TiH2, and intermetallics, such as TiAl and $TiAl_3$. A specific instance of an alloy includes Ti-6Al,4V, among others. In another embodiment, the metal powder comprises at least approximately 45% of the volume of the feedstock, while in still another, it comprises between approximately 54.6% and 70.0%. In addition, Ti—Al alloys may consists essentially of 32-38% of Al and the balance of Ti and contains .005-.20% of B, and the alloy which essentially consists of the above quantities of Al and Ti and contains, in addition to the above quantity of B, up to .2% of C, up to .3% of O and/or up to .3% of N (provided that O+N add up to .4%) and c) .05-3.0% of Ni and/or .05-3.0% of Si, and the balance of Ti. Examples of metals for use in the present invention include but are not limited to: stainless steel including martensitic and austenitic stainless steel, steel alloys, tungsten alloys, soft magnetic alloys such as iron, iron-silicon, electrical steel, iron-nickel (50Ni-50F3), low thermal expansion alloys, or combinations thereof. In one embodiment, the powdered metal is a mixture of stainless steel, brass and tungsten alloy. The stainless steel used in the present invention may be any 1 series carbon steels, 2 series nickel steels, 3 series nickel-chromium steels, 4 series molybdenum steels, series chromium steels, 6 series chromium-vanadium steels, 7 series tungsten steels, 8 series nickel-chromium-molybdenum steels, or 9 series silicon-manganese steels, e.g., 102, 174, 201, 202, 300, 302, 303, 304, 308, 309, 316, 316L, 316Ti, 321, 405, 408, 409, 410, 416, 420, 430, 439, 440, 446 or 601-665 grade stainless steel. For example, the individual upper primer insert portion and lower primer insert portion may be formed from SAE grade: 409, 410, 430, 440A, 440B, 440C, 440F, 410, 416, 420, 420F, 430F, 431, 630 (17-4 stainless steel), 301, 301LN, 304, 304L, 304L, 304LN, 304H, 305, 310, 310S, 316, 316LN, 316L, 316L, 316L, 316Ti, 316LN, 317L, 321, 321H, 2304, 2205, J405, 904L, 254SMO, 620Ni, 718Ni, 920, or super chrome.

As known to those of ordinary skill in the art, stainless steel is an alloy of iron and at least one other component that imparts corrosion resistance. As such, in one embodiment, the stainless steel is an alloy of iron and at least one of chromium, nickel, silicon, molybdenum, or mixtures thereof. Examples of such alloys include, but are not limited to, an alloy containing about 1.5 to about 2.5 percent nickel, no more than about .5 percent molybdenum, no more than about .15 percent carbon, and the balance iron with a density ranging from about 7 $g/cm^3$ to about 8 $g/cm^3$; an alloy containing about 6 to about 8 percent nickel, no more than about .5 percent molybdenum, no more than about .15 percent carbon, and the balance iron with a density ranging from about 7 $g/cm^3$ to about 8 $g/cm^3$; an alloy containing about .5 to about 1 percent chromium, about .5 percent to about 1 percent nickel, no more than about .5 percent molybdenum, no more than about 2 percent carbon, and the balance iron with a density ranging from about 7 $g/cm^3$ to about 8 $g/cm^3$; an alloy containing about 2 to about 3 percent nickel, no more than about .5 percent molybdenum, about .3 to about .6 percent carbon, and the balance iron with a density ranging from about 7 $g/cm^3$ to about 8 $g/cm^3$; an alloy containing about 6 to about 8 percent nickel, no more than about .5 percent molybdenum, about .2 to about .5 percent carbon, and the balance iron with a density ranging from about 7 $g/cm^3$ to about 8 $g/cm^3$; an alloy containing about 1 to about 1.6 percent chromium, about .5 percent or less nickel, no more than about .5 percent molybdenum, about .9 to about 1.2 percent carbon, and the balance iron with a density ranging from about 7 $g/cm^3$ to about 8 $g/cm^3$; and combinations thereof.

Suitable tungsten alloys include an alloy containing about 2.5 to about 3.5 percent nickel, about .5 percent to about 2.5 percent copper or iron, and the balance tungsten with a density ranging from about 17.5 $g/cm^3$ to about 18.5 $g/cm^3$; about 3 to about 4 percent nickel, about 94 percent tungsten, and the balance copper or iron with a density ranging from about 17.5 $g/cm^3$ to about 18.5 $g/cm^3$; and mixtures thereof. The insert may be made by any method including MIM, cold forming, forming, milling, machining, printing, 3D printing, additive manufacturing, etching and so forth.

The polymeric and composite casing components may be formed by molding a polymer ammunition cartridge blank that extends to a primer insert which is overmolded to form an unitary polymer ammunition cartridge blank with the injection molded including overmolding into the flash aperture to the flash aperture groove.

Polymeric materials must have propellant compatibility and resistance to gun cleaning solvents and grease, as well as resistance to chemical agents, biological agents and atmospheric conditions. The polymeric materials must have a temperature resistance higher than the cook-off temperature of the propellant, typically about 320° F. The polymeric materials must have elongation-to-break values that to resist deformation under interior ballistic pressure as high as 60,000 psi in all environments (temperatures from about −65 to about 320° F. and humidity from 0 to 100% RH). The components may be formed from high-strength polymer, polymer blends with metals, nonmetals, and/or ceramics; composites; or ceramics. Examples of suitable high strength polymers include composite polymer material including a metal powder polymer blend, nylon 6/6, nylon 6, and glass fibers; and a specific gravity in a range of 3-10. The polymer material also includes about .5-15%, preferably about 1-12%, and most preferably about 2-9% by weight, of nylon 6/6 or fibers known to the skilled artisan, about .5-15%, preferably about 1-12%, and most preferably about 2-9% by weight, of nylon 6, and about .5-15%, preferably about 1-12%, and most preferably about 2-9% by weight, of glass fibers. It is most suitable that each of these ingredients be included in amounts less than 10% by weight.

Examples of suitable polymers include polyurethane prepolymer, cellulose, fluoro-polymer, ethylene inter-polymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyaryl-sulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, or urethane hybrids. Examples of suitable polymers also include aliphatic or aromatic polyamide, polyeitherimide, polysulfone, polyphenylsulfone, poly-phenylene oxide, liquid crystalline polymer and polyketone. Examples of suitable composites include polymers such as polyphenylsulfone reinforced with between about 30 and about 70 wt %, and preferably up to about 65 wt % of one or more reinforcing materials selected from glass fiber, ceramic fiber, carbon fiber, mineral fillers, organo nanoclay, or carbon nanotube. Preferred reinforcing materials, such as chopped surface-treated E-glass fibers provide flow characteristics at the above-described loadings comparable to unfilled polymers to provide a desirable combination of strength and flow characteristics that permit the molding of head-end components. Composite components can be formed by machining or injection molding. Finally, the cartridge case must retain sufficient joint strength at cook-off temperatures. The cartridge casing body and polymer ammunition cartridge blanks may be made of a modified ZYTEL resin, available from E.I. DuPont De Nemours Co., a modified 612 nylon resin, modified to increase elastic response. More specifically, polymers suitable for molding of the projectile-end component have one or more of the following properties: Yield or tensile strength at −65° F.>10,000 psi Elongation-to-break at −65° F.>15% Yield or tensile strength at 73° F.>8,000 psi Elongation-to-break at 73° F.>50% Yield or tensile strength at 320° F.>4,000 psi Elongation-to-break at 320° F.>80%. Polymers suitable for molding of the middle-body component have one or more of the following properties: Yield or tensile strength at −65° F.>10,000 psi Yield or tensile strength at 73° F.>8,000 psi Yield or tensile strength at 320° F.>4,000 psi.

Commercially available polymers suitable for use in the present invention thus include polyphenylsulfones; copolymers of polyphenylsulfones with polyether-sulfones or polysulfones; copolymers and blends of polyphenylsulfones with polysiloxanes; poly(etherimide-siloxane); copolymers and blends of polyetherimides and polysiloxanes, and blends of polyetherimides and poly(etherimide-siloxane) copolymers; and the like. Particularly preferred are polyphenylsulfones and their copolymers with poly-sulfones or polysiloxane that have high tensile strength and elongation-to-break to sustain the deformation under high interior ballistic pressure. Such polymers are commercially available, for example, RADEL R5800 polyphenylesulfone from Solvay Advanced Polymers. The polymer can be formulated with up to about 10 wt % of one or more additives selected from internal mold release agents, heat stabilizers, anti-static agents, colorants, impact modifiers and UV stabilizers.

One embodiment includes a primer insert that is overmolded with a polymer based material, e.g., polybutylene, polycarbonates, polypropylene, polysulfones, polyphenylesulfone polyphenylesulfone and derivatives thereof. In one embodiment the primer insert includes a lip or flange to extract the case from the weapon. One 2-cavity mold to produce the case using a stripper plate tool using an Osco hot spur and two subgates per cavity. Another embodiment includes a subsonic version, the difference from the standard may be the walls are thicker thus requiring less powder or the cartridge may contain a reduced powder load. This will decrease the velocity of the bullet thus creating a subsonic round.

The insert extraction grooves are used to give the polymer case a tough enough ridge and groove for the weapons extractor to grab and pull the case out the chamber. The primer insert may be made of 17-4 stainless steal that is hardened to 42-45rc. The primer insert may be made of aluminum, brass, cooper, steel, stainless steal, composites, composites blends, metal composites blends, metal blends, polymer blends, metal doped polymers, alloys, or even an engineered resin with enough tensile strength. The insert may be made by any method including MIM, forging, casting, hot forming, cold forming, forming, milling, machining, stamped, printing, 3D printing, additive manufacturing, etching and so forth. The insert is over molded in an injection molded process using a polymer material doped with nano clay particles and/or Nylon material. In addition, an engineered resin able to withstand the demand on the insert allows injection molded and/or even transfer molded.

One of ordinary skill in the art will know that many propellant types and weights can be used to prepare workable ammunition and that such loads may be determined by a careful trial including initial low quantity loading of a given propellant and the well known stepwise increasing of a given propellant loading until a maximum acceptable load is achieved. Extreme care and caution is advised in evaluating new loads. The propellants available have various burn rates and must be carefully chosen so that a safe load is devised.

The description of the embodiments should be taken as illustrating, rather than as limiting, the present invention as defined by the claims. As will be readily appreciated, numerous combinations of the features set forth above can be utilized without departing from the present invention as set forth in the claims. Such variations are not regarded as a departure from the spirit and scope of the invention, and all such modifications are intended to be included within the scope of the following claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

This application incorporated the contents of each by reference in their entirety U.S. patent application Ser. No. 14/011,202 filed on Aug. 27, 2013 which is a Divisional Application of U.S. patent application Ser. No. 13/292,843 filed on Nov. 9, 2011 (now U.S. Pat. No. 8,561,543) which claims the benefit of U.S. Provisional Patent Application Ser. No. 61/456,664, filed Nov. 10, 2010.

What is claimed is:

1. A polymeric ammunition cartridge made by the process of:
providing a polymer ammunition cartridge blank comprising an unformed top end connected to a cartridge bottom by a polymer middle body to form a propellant chamber, wherein the unformed top end comprises a nose end aperture, wherein the cartridge bottom comprises a primer insert comprising a top surface opposite a bottom surface and a coupling element that extends from the bottom surface, a primer recess in the top surface that extends toward the bottom surface, a primer flash hole aperture positioned in the primer recess to extend through the bottom surface and a groove in the primer recess positioned around the flash hole aperture, wherein the middle body is overmolded through the primer flash hole aperture into the groove;
providing a thermal form comprising a body segment extending to a shoulder segment that transitions to a neck segment that terminates at a tip segment end and a mandrel extendable into the neck segment at the tip segment end;
heating the thermal form;
inserting the unformed top end into the thermal form;
extending the mandrel into the nose end aperture;
contacting the unformed top end with the tip segment end to form a polymer ammunition cartridge having a shoulder connected to a neck, wherein the nose end aperture forms a projectile aperture; and
removing the polymer ammunition cartridge from the thermal form.

2. The polymeric ammunition cartridge of claim 1, wherein the polymer ammunition cartridge blank is formed from a ductile polymer.

3. The polymeric ammunition cartridge of claim 1, further comprising the steps of forming a texturing at the nose end aperture.

4. The polymeric ammunition cartridge of claim 3, wherein the texturing includes one or more selected from etching, grooves, hatching, knurling, a texture, rings, and free formed textures.

5. The polymeric ammunition cartridge of claim 3, wherein the texturing is on an internal neck region.

6. The polymeric ammunition cartridge of claim 5, wherein the texturing includes one or more selected from etching, grooves, hatching, knurling, a texture, rings, and free formed textures.

7. The polymeric ammunition cartridge of claim 1, wherein the mandrel comprises a texturing that textures the nose end aperture.

8. The polymeric ammunition cartridge of claim 1, wherein the polymer ammunition cartridge blank comprise a nylon polymer.

9. The polymeric ammunition cartridge of claim 1, wherein the polymer ammunition cartridge blank is formed from a fiber-reinforced polymeric material.

10. The polymeric ammunition cartridge of claim 9, wherein the fiber-reinforced polymeric composite contains between about 10 and about 70 wt % glass fiber fillers, mineral fillers, or mixtures thereof.

11. The polymeric ammunition cartridge of claim 1, wherein the polymer ammunition cartridge blank comprise a polymers selected from the group consisting of polyurethane prepolymer, cellulose, fluoro-polymer, ethylene interpolymer alloy elastomer, ethylene vinyl acetate, nylon, polyether imide, polyester elastomer, polyester sulfone, polyphenyl amide, polypropylene, polyvinylidene fluoride or thermoset polyurea elastomer, acrylics, homopolymers, acetates, copolymers, acrylonitrile-butadinen-styrene, thermoplastic fluoro polymers, inomers, polyamides, polyamide-imides, polyacrylates, polyatherketones, polyarylsulfones, polybenzimidazoles, polycarbonates, polybutylene, terephthalates, polyether imides, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, polycarbonates, allyls, aminos, cyanates, epoxies, phenolics, unsaturated polyesters, bismaleimides, polyurethanes, silicones, vinylesters, urethane hybrids, polyphenylsulfones, copolymers of polyphenylsulfones with polyethersulfones or polysulfones, copolymers of poly-phenylsulfones with siloxanes, blends of polyphenylsulfones with polysiloxanes, poly(etherimide-siloxane) copolymers, blends of polyetherimides and polysiloxanes, and blends of polyetherimides and poly(etherimide-siloxane) copolymers.

12. The polymeric ammunition cartridge of claim 1, wherein the polymer ammunition cartridge blank comprises one or more polymers selected from the group consisting of polybutylene, polybutylene terephthalates, polyphenyl sulfones, polyether sulfones, and polycarbonates.

13. The polymeric ammunition cartridge of claim 1, wherein the polymer ammunition cartridge blank is a .17 HMR, .17 Hornet, .17 Ackley Hornet, .17 Winchester Super Magnum, .17-32 Magnum, .17 VHA, .17 Remington, .17/222, 0.17 Mach .17 Ackley Improved Bee, .17-357 RG, .17 Remington Fireball, .17 Incinerator, 4.39×39Rmm SPS, .204 Ruger, 5 mm Remington Rimfire Magnum, 5.45×39 mm Russian family, .22 Short, .22 Long, .22 Long Rifle, .22 Stinger, 22 Extra Long, .297/230 Morris Extra Long, .22 Hornet, .22 Rem Automatic, 5.66×39 MPS, .22 Rem Jet, .218 Bee, .219 Zipper, .22 Hornet-K, .220 Swift, .222 Remington, .222 Remington Magnum, .223 Remington, 5.56×45 mm NATO, 5.7×28 mm, .22 TCM, 5.8×42 Chinese, .224 Weatherby Magnum, .225 Winchester, .223 Winchester Super Short Magnum (Obsolete) .223 Ackley Improved, .219 Donaldson Wasp, .221 Remington Fireball, .22-250 Remington and many more, .243 Winchester, .244 Remington, 6 mm Remington, 6 mm plastic airsoft BBs, 6 mm Whisper, 6 mm PPC, 6 mm Bench Rest Remington, 6×45 mm, 6×47 mm, 6 mm Cheetah, .240 Weatherby, 6×62 Freres, 6 mm Norma BR, 6XC Tubb, 6 mm JDJ, 6 mm SAW, 6-250 Walker, 6.17 Spitfire, 6.17 Flash, 6 mm Lee Navy, and more, .25 ACP (.251"), 250/3000 Savage, 257 Roberts, 25-06 (.257"), .277, 6.5×55 mm, .260 Remington, 26 Nosler, 6.5 Creedmoor, 6.5×47 Lapua, .270 Winchester, 6.8, 6.8 SPC, .280 Remington, 7 mm-08 Remington, 7 mm Remington Magnum, 7×57 mm Mauser, 7×64 mm, .30 Luger (7.65×21 mm Luger), .30-30 Win, 30 Herrett, .300 Whisper, .30-378 Weatherby, 7.63 Mannlicher-Schoenauer, 7.63 Mauser, .30 USA Rimless, .308 Corbon, .3-9 Savage, .30 Kurz, 300 AAC Blackout (7.62×35 mm), 7.5 mm Schmidt-Rubin, .300 Winchester Magnum, .30 Carbine, 309 JDJ, .30-03, 0.30-06 Springfield, .30-06 JDJ, .307 GNR, .308 Winchester (7.62×51 mm NATO), .300 Weatherby Magnum, .30 Army (.30-40 Krag), 7.82 mm Lazzeroni, and dozens more, .303 British, 7.62×39 mm Soviet, 7.62×54 mmR, 7.62×25 mm, 7.7×58 mm, .32 ACP, 8×57 mm IS, .325 WSM, 8 mm Remington Magnum, 8 mm plastic (airsoft) BBs, .338 Lapua, .338 Norma Magnum, .338 Winchester Magnum, .338-378 Weatherby Magnum, 9 mm Luger, 9 mm Ultra, 9 mm Bayard Long, 9 mm Browning Long, 9 mm Mauser, 9 mm Winchester Magnum, 9 mm Glisenti, 9×21 mm, 9×23 mm Winchester, 9 mm Mi-Bullet, 9 mm Steyr, .356 Team Smith & Wesson, 9 mm Federal, 9 mm×25 mm Dillon, 9 mm Action Express, .380 ACP (9 mm Short), 9×56 mm Mannlicher-Schoenauer, 9 mm×57 mm Mauser, .38 Super, .38 Special, .357 Magnum, .357 SIG, .35 Remington, 9×18 mm Makarov, 9.3×62 mm, 9.3×64 mm Brenneke, 9.3×72 mmR, 9.3×74 mm, .375 H&H Magnum, 9.5×57 mm Mannlicher-Schönauer (.375 Rimless Nitro Express (RNE)×2¼), .40 S&W, 10 mm Auto, .444 Marlin, .44 S&W Russian, .44 S&W Special, .44 Remington Magnum, .44 Auto Mag, .440 Cor-Bon, 44/454 JDJ Woodswalker, .45 ACP, .45 GAP, .454 Casull, .45 Long Colt, .455 Webley, .50 BMG, .50 Action Express, 12.7×108 mm polymer ammunition cartridge blank.

\* \* \* \* \*